(12) United States Patent
Turgeman et al.

(10) Patent No.: US 9,170,412 B2
(45) Date of Patent: Oct. 27, 2015

(54) OBJECTIVE LENS CHANGER MECHANISM SUITABLE FOR USE IN A COMPACT MICROSCOPY SYSTEM

(71) Applicant: IDEA MACHINE DEVELOPMENT DESIGN & PRODUCTION LTD., Rehovot (IL)

(72) Inventors: Shlomo Turgeman, Rishon le-Tzion (IL); Oded Anner, Kfar Saba (IL); Eitan Shefer, Ramat Gan (IL); Royi Levav, Aviel (IL)

(73) Assignee: Idea Machines Development Design & Production Ltd., Rehovot (IL)

(*) Notice: Subject to any disclaimer, the term of this patent is extended or adjusted under 35 U.S.C. 154(b) by 223 days.

(21) Appl. No.: 13/832,474

(22) Filed: Mar. 15, 2013

(65) Prior Publication Data

US 2014/0015953 A1 Jan. 16, 2014

Related U.S. Application Data

(63) Continuation-in-part of application No. PCT/US2012/021138, filed on Jan. 12, 2012.

(60) Provisional application No. 61/431,891, filed on Jan. 12, 2011, provisional application No. 61/501,283, filed on Jun. 27, 2011, provisional application No. 61/433,341, filed on Jan. 17, 2011.

(51) Int. Cl.
*G02B 21/00* (2006.01)
*G02B 7/00* (2006.01)
*G02B 21/16* (2006.01)
*G02B 21/24* (2006.01)
*G02B 21/26* (2006.01)
*G02B 21/36* (2006.01)

(52) U.S. Cl.
CPC ............ *G02B 21/0052* (2013.01); *G02B 7/003* (2013.01); *G02B 21/16* (2013.01); *G02B 21/248* (2013.01); *G02B 21/26* (2013.01); *G02B 21/367* (2013.01)

(58) Field of Classification Search
CPC .................................. G02B 21/00; G02B 7/00
See application file for complete search history.

(56) References Cited

U.S. PATENT DOCUMENTS

| 4,385,812 | A | 5/1983 | Wille et al. |
| 5,313,334 | A | 5/1994 | Tomiyama et al. |
| 5,966,204 | A * | 10/1999 | Abe ............................. 356/51 |
| 6,266,196 | B1 | 7/2001 | Do et al. |

(Continued)

FOREIGN PATENT DOCUMENTS

| DE | 102007058341 A1 | 6/2009 |
| EP | 0169387 A2 | 1/1986 |

(Continued)

OTHER PUBLICATIONS

International Preliminary Report on Patentability for PCT/US2012/021138.

*Primary Examiner* — Richard Torrente
*Assistant Examiner* — Irfan Habib
(74) *Attorney, Agent, or Firm* — Daniel Feigelson; Fourth Dimension IP

(57) ABSTRACT

There is disclosed an apparatus for magnifying and capturing images of one or more samples, as well as an apparatus for changing objective lenses. Methods of using the apparatuses, and other embodiments, are also disclosed.

20 Claims, 18 Drawing Sheets

(56) References Cited

U.S. PATENT DOCUMENTS

| | | | |
|---|---|---|---|
| 6,400,501 B2* | 6/2002 | Tsuchiya et al. | 359/380 |
| 6,515,810 B1 | 2/2003 | Melford | |
| 6,850,362 B2 | 2/2005 | Brooker | |
| 7,105,795 B2 | 9/2006 | Cartlidge et al. | |
| 7,109,459 B2 | 9/2006 | Geiger et al. | |
| 7,239,909 B2* | 7/2007 | Zeman | 600/473 |
| 7,466,408 B2* | 12/2008 | Tanaami | 356/317 |
| 7,486,329 B2* | 2/2009 | Endo | 348/345 |
| 7,556,626 B2 | 7/2009 | Ueda et al. | |
| 7,892,169 B2* | 2/2011 | Gono et al. | 600/178 |
| 8,078,263 B2* | 12/2011 | Zeman et al. | 600/473 |
| 8,369,011 B2* | 2/2013 | Hayashi et al. | 359/379 |
| 2002/0111546 A1* | 8/2002 | Cook et al. | 600/322 |
| 2003/0030896 A1 | 2/2003 | Brooker | |
| 2003/0104288 A1* | 6/2003 | Pang | 430/5 |
| 2004/0113043 A1* | 6/2004 | Ishikawa et al. | 250/201.4 |
| 2004/0218263 A1 | 11/2004 | Brugal | |
| 2005/0175233 A1* | 8/2005 | Yoneyama et al. | 382/145 |
| 2005/0254696 A1* | 11/2005 | Bacus et al. | 382/128 |
| 2006/0092503 A1 | 5/2006 | Saunders | |
| 2006/0157637 A1* | 7/2006 | Karasawa et al. | 250/201.7 |
| 2006/0164723 A1 | 7/2006 | Storz et al. | |
| 2007/0097495 A1 | 5/2007 | Knoblich et al. | |
| 2007/0273877 A1* | 11/2007 | Kawano et al. | 356/318 |
| 2008/0099661 A1* | 5/2008 | Virag et al. | 250/201.3 |
| 2009/0168156 A1 | 7/2009 | Ariga | |
| 2009/0273830 A1* | 11/2009 | Sase | 359/385 |
| 2010/0194414 A1* | 8/2010 | Jun et al. | 324/753 |
| 2010/0309546 A1 | 12/2010 | Seifert | |
| 2010/0315707 A1 | 12/2010 | Gilbert et al. | |
| 2011/0013275 A1 | 1/2011 | Hein et al. | |
| 2011/0134521 A1 | 6/2011 | Truong et al. | |
| 2012/0044342 A1* | 2/2012 | Hing et al. | 348/79 |

FOREIGN PATENT DOCUMENTS

| | | |
|---|---|---|
| EP | 2107406 A1 | 10/2009 |
| EP | 2202557 A1 | 6/2010 |
| GB | 2469443 A | 10/2010 |
| IL | 143836 B1 | 6/2006 |
| WO | 95/19552 A1 | 7/1995 |
| WO | 98/52016 A1 | 11/1998 |
| WO | 01/16635 A1 | 3/2001 |
| WO | 2004/077123 A2 | 9/2004 |
| WO | 2008/019295 A2 | 2/2008 |
| WO | 2008/032096 A1 | 3/2008 |
| WO | 2010/036972 A1 | 4/2010 |
| WO | 2010/048041 A1 | 4/2010 |

* cited by examiner

OBJECTIVE LENS CHANGER MECHANISM SUITABLE FOR USE IN A COMPACT MICROSCOPY SYSTEM

This application is a continuation-in-part and claims the benefit of PCT/US2012/021138, filed Jan. 12, 2012, and claims priority from and the benefit of the following U.S. provisional patent applications: U.S. Ser. No. 61/431,891, filed Jan. 12, 2011 and entitled "Compact Microscopy System", U.S. Ser. No. 61/433,341, filed Jan. 17, 2011, and U.S. Ser. No. 61/501,283, filed Jun. 27, 2011 and entitled "System and Method for a High Precision Automated Objective Changer". The contents of these applications are incorporated herein by reference.

FIELD

The present invention relates to the field of accurate optical scanning and imaging of samples and more particularly, to biological microscopy.

BACKGROUND

Current microscopy systems used for observing biological samples are generally based on a static and massive microscope body. Current microscope designs include complex connections to optical units such as an objective turret, an illumination unit, filter wheels, shutters, a camera, internal optics and other units. To enable the scanning of a given sample, devices to enable motion of the sample holder in the X, Y and Z directions are added to the microscope body, often being provided by vendors other than the microscope manufacturer. Such microscope systems are large, heavy and cumbersome, and include multiple control interfaces making operation and maintenance complex and expensive. During the imaging process of these microscopic systems, the sample is moved to capture images at different locations along the sample, while the optics units are static. Since, in order to cover a large number of image locations in a minimum of time, the sample holder may need to be subjected to motion with high levels of acceleration, this mode of operation may adversely affect the accuracy and quality of the acquired images, and may have critical impact in live cell experiments. Sample motion in biological experiments can affect its results and provide incorrect interpretation of these results.

Furthermore, in conventional microscopy systems used for biological applications, the scanning of a large area with multiple samples is a time-consuming task, and many of the images obtained may contain little or no useful data. In current microscopy systems used for high-content screening, the field of view imaged by the system optics is on the order of 100-500 by 100-500 microns, depending on the optics magnification used. The overall area that can be imaged in a standard sample-holding microplate is on the order of 7000 square millimeters. The number of images that can be obtained from a single microplate therefore numbers in the hundreds of thousands; attempting to obtain all those images within an acceptable time frame is not feasible. A typical method for dealing with this is to do some sort of statistical sampling of the microplate area. However, in any such method, most of the area is not sampled and many of the images obtained contain non-useful data.

BRIEF DESCRIPTION OF EMBODIMENTS OF THE INVENTION

There is provided, in accordance with an embodiment of the invention, an apparatus for magnifying and capturing images of one or more samples, the apparatus comprising:

a stationary sample holder;

a linear optical scanner having a single optical input axis and which scanner moves relative to said stationary sample holder, the optical scanner having (a) an objective lens which is movable along three generally mutually orthogonal axes, (b) a first mirror which reflects incident electromagnetic radiation to and from the objective lens and which can be moved in concert with said objective lens along the first and second of said axes and (c) a second mirror which reflects incident electromagnetic radiation to and from the first mirror and which can be moved in concert with said first mirror along the first axis;

an autofocus unit which directs incident electromagnetic radiation of a first wavelength toward the sample holder along said optical input axis and collects reflections at said wavelength received along said optical input axis;

an illumination unit which directs electromagnetic radiation of a second wavelength toward the sample holder along the optical input axis of said scanner;

an electromagnetic radiation capturing unit for acquiring images from said sample holder which are transmitted along the optical input axis, said electromagnetic radiation capturing unit including at least one sensor; and a tube lens positioned along said optical input axis, the tube lens focusing electromagnetic radiation of a third wavelength on said electromagnetic radiation capturing unit.

In some embodiments, the autofocusing unit includes an auto focus input filter which is positioned along the optical input axis and which reflects electromagnetic radiation of the first wavelength from the auto focusing unit onto the optical input axis and from the optical input axis to the auto focusing unit. In some embodiments, the illumination unit includes an illumination input filter which is positioned along the optical input axis and which reflects electromagnetic radiation having the second wavelength from the illumination unit onto the optical input axis toward said sample holder, the illumination input filter being positioned remotely from the auto focus input filter relative to said sample holder. In some embodiments, electromagnetic radiation of the third wavelength returning from the scanner passes through both input filters. In some embodiments, the second and third wavelengths are the same wavelength. In some embodiments, the second and third wavelengths are different wavelengths. In some embodiments, the illumination unit directs radiation of several second wavelengths toward the sample holder, and said tube lens focuses electromagnetic radiation of several third wavelengths on said at least one sensor. In some embodiments, at least one of the several third wavelengths is different from all of the several second wavelengths. In some embodiments, all of the several third wavelengths are different from the several second wavelengths.

In some embodiments, the electromagnetic radiation capturing unit comprises at least two CCD cameras. In some embodiments, the electromagnetic radiation capturing unit comprises at least three CCD cameras.

In some embodiments, the apparatus further comprises a filtering device selected from the group consisting of (a) at least one prism, (b) at least one mirror, (c) at least one filters, and (d) combinations thereof, arranged to direct electromagnetic radiation of a different wavelength to each of said CCD cameras. In some embodiments, the electromagnetic radiation capturing unit comprises a single CCD camera equipped with a plurality of sensors and a device that directs incoming electromagnetic radiation of a different wavelength onto each of said sensors.

In some embodiments, the objective lens is a turretless objective lens. In some embodiments, the turretless objective lens is fixedly attached to the optical scanner. In some embodiments, the turretless objective lens is removably attached to the optical scanner. In some embodiments, the turretless objective lens is removably attached to the optical scanner via a mechanism for removably holding an objective lens in an optical instrument in a predetermined position. In some embodiments, the objective lens has a first surface proximal to the sample holder and a second surface associated therewith distal to the sample holder, and the mechanism for removably holding an objective lens in an optical instrument in a predetermined position comprises: a kinematic base, the kinematic base defining an aperture therethrough, the kinematic base having defined on a surface thereof facing the second surface associated with the objective lens at least one of (a) a plurality of indentations and (b) a plurality of protrusions; and the second surface associated with the objective lens has at least one of (a) a plurality of protrusions which are alignable with the indentations on the facing surface of the kinematic base and (b) a plurality of indentations which are alignable with the protrusions on the facing surface of the kinematic base; wherein at least one of the facing surface of the kinematic base and the second surface associated with the objective lens is made of a ferromagnetic material, the mechanism further comprising at least one of (a) a plurality of magnets which are installed within the second surface associated with the objective lens, when the facing surface of the kinematic base is made of a ferromagnetic material, and (b) a plurality of magnets which are installed within the facing surface of the kinematic base, when the second surface associated with the objective lens is made of a ferromagnetic material, such that, when the plurality of protrusions are aligned with the plurality of indentations and brought into proximity therewith, the optical axis of objective lens is aligned with the aperture in the kinematic base and the plurality of magnets are sufficiently close to the ferromagnetic material to hold the objective lens in said predetermined position relative to said kinematic base.

In some embodiments, the kinematic base contains indentations and the second surface associated with the objective lens contains protrusions. In some embodiments, the indentations in the kinematic base are in the form of V-shaped grooves, the axes of which are aligned generally perpendicularly to the aperture defined in the kinematic base. In some embodiments, the V-shaped grooves substantially traverse the width of the kinematic base. In some embodiments, the second surface associated with the objective lens has a plurality of cylindrical wells defined therein, and the protrusions projecting from the second surface associated with the objective lens are spherical balls which are held in place by the walls of the cylindrical wells and protrude therefrom.

In some embodiments, the kinematic base contains protrusions and the second surface associated with the objective lens contains indentations. In some embodiments, the indentations in the second surface associated with the objective lens are in the form of V-shaped grooves, the axes of which are aligned generally perpendicularly to the optical axis of the objective lens. In some embodiments, the V-shaped grooves substantially traverse the width of the second surface associated with said objective lens. In some embodiments, the facing surface of the kinematic base has a plurality of cylindrical wells defined therein, and the protrusions projecting from said facing surface are spherical balls which are held in place by the walls of the cylindrical wells and protrude therefrom.

In some embodiments, the kinematic base is of substantially annular ring shape.

In some embodiments, the facing surface of the kinematic base is made of a ferromagnetic material, and a plurality of magnets are installed within the second surface associated with the objective lens. In some embodiments, the second surface associated with the objective lens is made of a ferromagnetic material and a plurality of magnets are installed within the upper surface of the kinematic base.

In some embodiments, the objective lens is mounted on a lens base having opposing surfaces and defining an aperture therethrough, a first of said opposing surfaces of the lens base being adapted to hold the objective lens so that the optical axis of the lens is aligned with said aperture defined through said lens base, and a second of said opposing surfaces of the lens base being said second surface associated with the objective lens.

In some embodiments, the apparatus comprises a plurality of turretless objective lenses, each of which may be removably attached to the optical scanner, which is adapted to hold a single turretless objective lens at a time. In some embodiments, the apparatus comprises a mechanism for removing one turretless objective lens and replacing it with a different turretless objective lens.

Thus there is also provided, in accordance with an embodiment of the invention, a mechanism for removably holding an objective lens in an optical instrument in a predetermined position, the mechanism comprising: a kinematic base, the kinematic base defining an aperture therethrough, the kinematic base having defined on a first surface thereof facing the objective lens at least one of (a) a plurality of indentations and (b) a plurality of protrusions; and an objective lens having a lower surface associated therewith facing said first surface of said kinematic base, said lower surface having at least one of (a) a plurality of protrusions which are alignable with the indentations on the first surface of the kinematic base and (b) a plurality of indentations which are alignable with the protrusions on the first surface of the kinematic base; wherein at least one of the upper surface of the kinematic base and the lower surface associated with the objective lens is made of a ferromagnetic material, the mechanism further comprising at least one of (a) a plurality of magnets which are installed within the lower surface associated with the objective lens, when the first surface of the kinematic base is made of a ferromagnetic material, and (b) a plurality of magnets which are installed within the first surface of the kinematic base, when the lower surface associated with the objective lens is made of a ferromagnetic material, such that, when said plurality of protrusions are aligned with said plurality of indentations and brought into proximity therewith, the optical axis of objective lens is aligned with the aperture in the kinematic base and the plurality of magnets are sufficiently close to the ferromagnetic material to hold the objective lens in said predetermined position relative to said kinematic base.

In some embodiments, the first surface of the kinematic base contains indentations and the lower surface associated with the objective lens contains protrusions. In some embodiments, the indentations in the kinematic base are in the form of V-shaped grooves, the axes of which are aligned generally perpendicularly to the aperture defined in the kinematic base. In some embodiments, the V-shaped grooves substantially traverse the width of the kinematic base. In some embodiments, the lower surface associated with the objective lens has a plurality of cylindrical wells defined therein, and the protrusions projecting from lower surface associated with the objective lens are spherical balls which are held in place by the walls of the cylindrical wells and protrude therefrom.

In some embodiments, the kinematic base contains protrusions and the lower surface associated with the objective lens contains indentations. In some embodiments, the indentations in the lower surface associated with the objective lens are in the form of V-shaped grooves, the axes of which are aligned generally perpendicularly to the optical axis of the objective lens. In some embodiments, the V-shaped grooves substantially traverse the width of the lower surface associated with said objective lens. In some embodiments, the first surface of the kinematic base has a plurality of cylindrical wells defined therein, and the protrusions projecting from said first surface are spherical balls which are held in place by the walls of the cylindrical wells and protrude therefrom.

In some embodiments, the kinematic base is of substantially annular ring shape.

In some embodiments, the first surface of the kinematic base is made of a ferromagnetic material, and a plurality of magnets are installed within the lower surface associated with the objective lens. In some embodiments, the lower surface associated with the objective lens is made of a ferromagnetic material and a plurality of magnets are installed within the first surface of the kinematic base.

In some embodiments, the objective lens is mounted on a lens base having opposing surfaces and defining an aperture therethrough, a first of the opposing surfaces of the lens base being adapted to hold the objective lens so that the optical axis of the lens is aligned with said aperture defined through said lens base, and a second of the opposing surfaces of the lens base being said lower surface associated with the objective lens.

In some embodiments, the objective lens is a turretless objective lens.

There is also provided, in accordance with an embodiment of the invention, an apparatus comprising a mechanism for removably holding an objective lens in an optical instrument in a predetermined position, as described above. In some embodiments, the optical apparatus comprises a plurality of turretless objective lenses. In some embodiments, the optical apparatus further comprises means for removing a first turretless objective lens from the kinematic base and replacing it with a second turretless objective lens. In some embodiments, the optical apparatus further comprises a changer for removing a first turretless objective lens from the kinematic base and replacing it with a second turretless objective lens. In some embodiments, the optical apparatus is selected from the group consisting of a scanner and microscope.

DETAILED DESCRIPTION

Embodiments of the invention will be better understood from the following detailed description, as well as with reference to the figures, in which.

Figure 1:
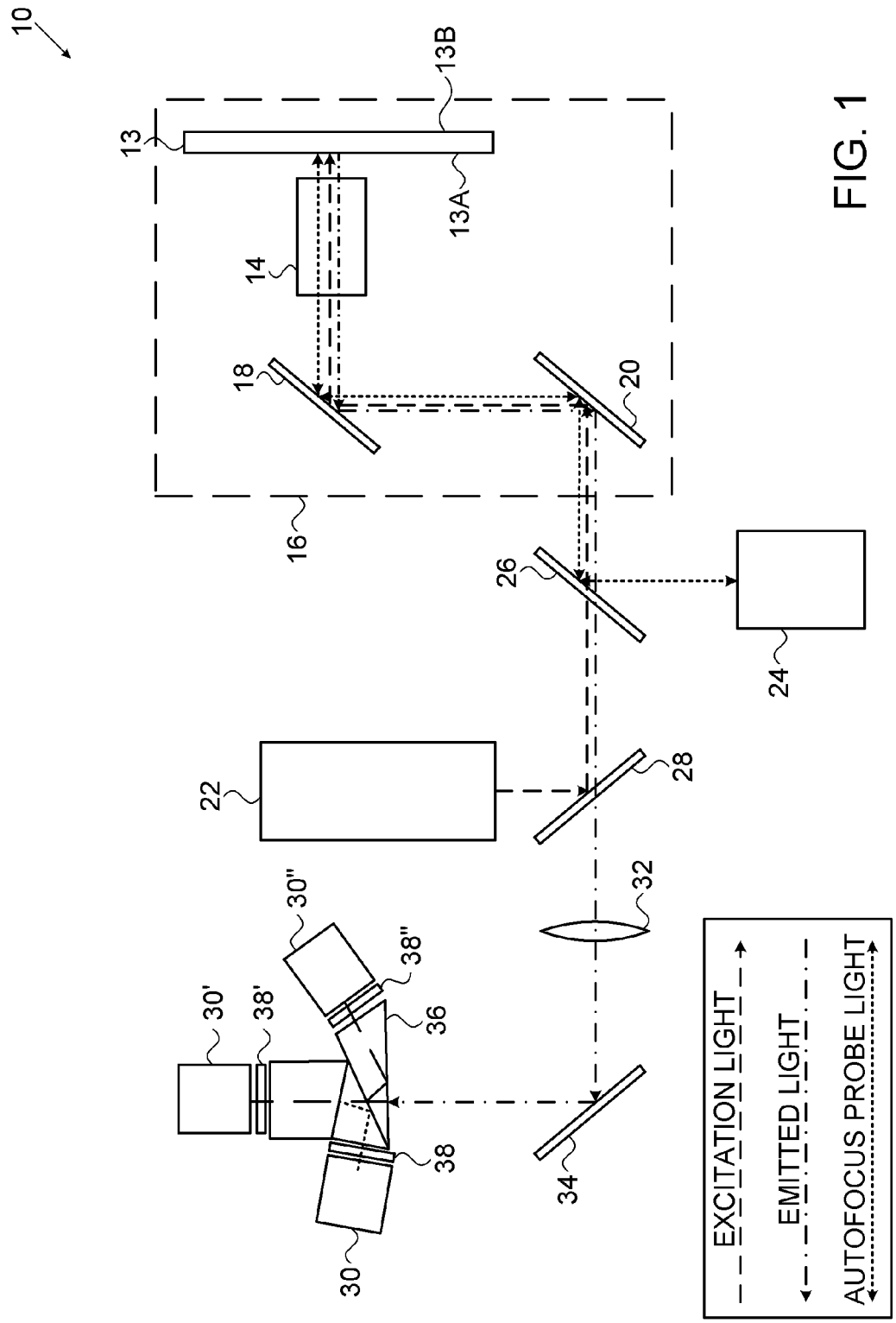
FIG. 1 is a schematic diagram of an embodiment of the present invention.
Figure 18:
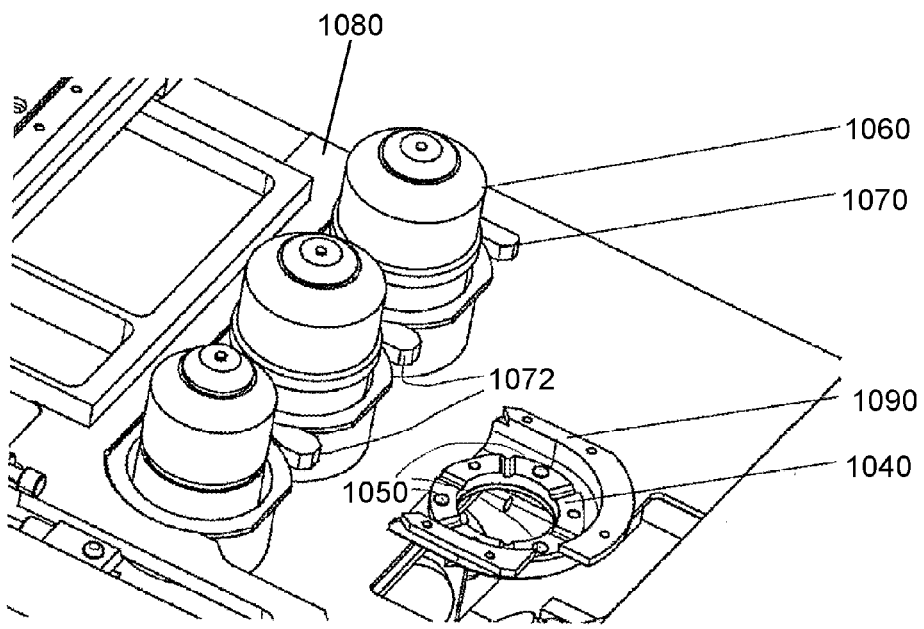
Figure 19:
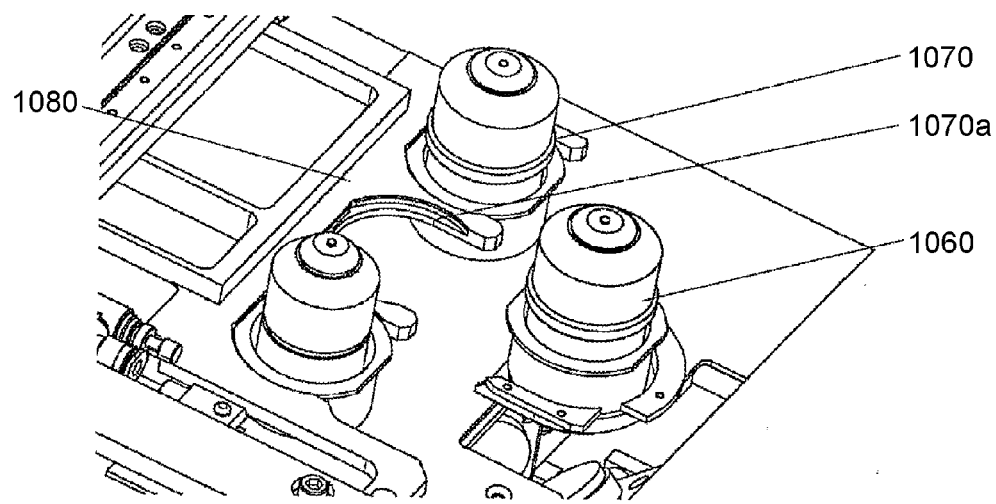
Figure 20:
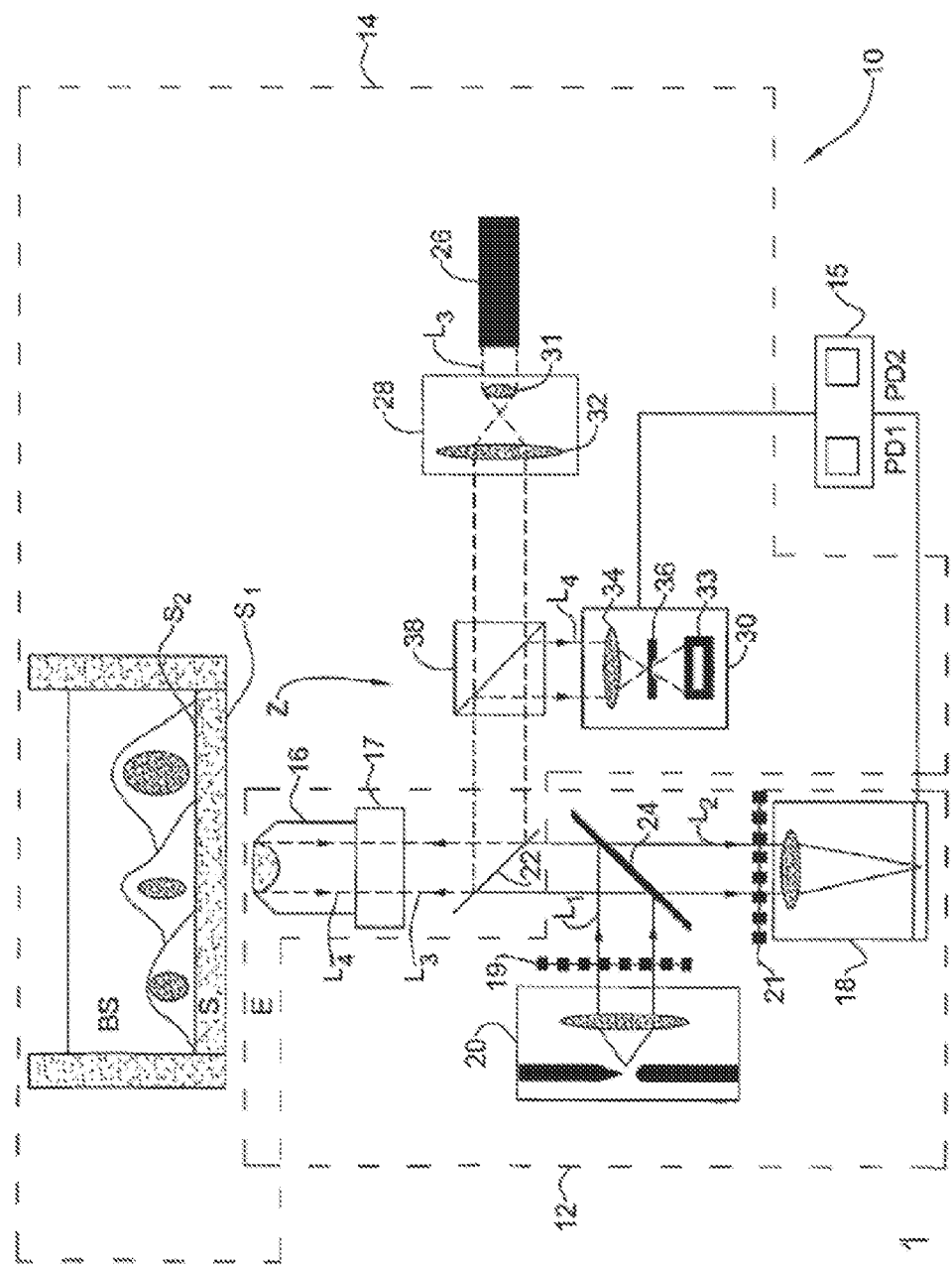

FIGS. 18 and 19 show how objective lenses may be stored and changed, in accordance with embodiments of the invention; and FIG. 20 is reproduction of FIG. 1 of U.S. Pat. No. 7,109,459.

Reference is now made to FIG. 1, which is a block diagram showing schematically an apparatus 10 constructed and operative in accordance with embodiments of the invention. Apparatus 10 contains a holder 12, which may be configured to hold a sample plate 13, for example a 6-, 24-, 96-, 384 or 1536-well plate commonly used to hold biological samples and having lower and upper faces 13a and 13b, respectively, containing a sample or multiple samples to be observed, as is known in the art. Holder 12 may also be configured to hold a microscope slide, a Petri dish, or another substrate having a bottom that is transparent to electromagnetic radiation of a wavelength or wavelengths of interest. For reference, sample plate 13, which is not itself part of the apparatus, lies in the XY-plane, so that through its lower face 13a, samples contained therein will be opposite the components of apparatus 10 that will be described below. A turretless objective lens, viz. a single objective lens 14, which is part of a linear XYZ scanner 16, is arranged so that the lens lies facing the sample holder (and, when a sample plate 13 is present, facing the lower face 13a of sample plate 13), and the optical axis of objective lens 14 lies along the Z-axis with respect to the sample holder. By "linear XYZ scanner" is meant a mechanism constructed and operative to move the objective lens 14 in three mutually perpendicular directions, wherein the "Z" direction is used to denote movement along the optical axis. Such scanners per se are known in the art, for example from Israel Patent No. 143836, filed Jun. 19, 2001 and entitled "Compact Linear Scanner System" or U.S. Pat. No. 6,850, 362, the contents of which are incorporated herein by reference. It will be appreciated that for the sake of simplicity, only some of the components of XYZ scanner 16 are shown in FIG. 1; a more detailed description of this component follows below. Among the components of the XYZ scanner that are shown in FIG. 1 are mirrors 18 and 20, which work together to redirect light along the optical axis of objective lens 14, such as when the XYZ scanner is arranged to operate in an inverse microscope configuration, to reflect light from illumination unit 22 and from autofocus unit 24 through objective lens 14. Mirror 18 is constructed and operative to move together with objective lens 14 in the X- and Y-directions, and mirror 20 is constructed and operative to move together with objective lens 14 and mirror 18 in the X-direction, in order to ensure that light is able to travel along the optical axis of objective lens 14. Mirrors 18 and 20 also reflect light received from the sample, including reflected incident light from illumination unit 22 or autofocus unit 24, or light which results from fluorescence of the sample, along the optical axis of objective lens 14 and away from the sample.

As shown in FIG. 1, apparatus 10 also comprises an autofocus unit 24. Autofocus units per se are known in the art. For use in accordance with embodiments of the present invention, the autofocus is preferably an autofocus unit that is usable in high-resolution, high-throughput microscopy applications, for example the autofocus unit and method described in PCT patent publication WO 03/077008 entitled "Auto-focusing method and device" and filed Mar. 13, 2003, or U.S. Pat. No. 7,109,459 of the same title, the contents of both of which are incorporated herein by reference. As explained in U.S. Pat. No. 7,109,459 with reference to FIG. 1 therein, which is reproduced here as FIG. 20 of the present patent application, "The auto-focusing device 14 comprises a light source (laser) 26 operating in an appropriate wavelength range—the red or infrared wavelength range in the present example (e.g., Uniphase 2 mW He—Ne); a beam expander assembly 28; the beam directing assembly including a beam splitting device 38; the objective lens arrangement 16; and a detection unit 30. The use of red (or infrared) light for auto-focusing purposes avoids sample bleaching or photo-damage, and is therefore ideally suited for live samples, such as GFP tagged cells.

"The detection unit 30 comprises a detector 33 of the kind generating an electrical response to light signal impinging thereon (e.g., a PIN diode detector, for example the UDT PIN 10DF model commercially available from United Detector Technology), which is associated with a suitable imaging optics, composed of an imaging lens 34 and a confocal pinhole 36 in the present example. The provision of the pinhole 36 is aimed at rejecting (filtering out) more efficiently light components reflected from out-of-focus locations, and sharpening the detected intensity peak corresponding to the light components reflected from the in-focus locations.

"The beam splitting device 38 (typically a partially transparent mirror or 50% reflecting cube) is used for spatially separating between the light beam $L_3$ emitted by the laser 26 and reflections thereof $L_4$ to thereby enable propagation of the reflections $L_4$ only to the detector 33. It should be noted that the use of the partially transparent mirror or 50% reflecting cube as the beam splitter 38 in the auto-focusing channel results in that 75% of the incident and reflected power is lost because of passing twice through the semi-transparent surface of the beam splitter 38. These losses can be reduced by using polarized light and a polarization controlling assembly (polarizing beam splitter). More specifically, this can be implemented by using a linearly polarized light $L_3$ passing through a polarizing surface of the beam splitter 38, and a polarization rotating element (e.g., $\lambda/2$ waveplate) in the optical path of light $L_4$ returned from the sample to adjust the polarization of light $L_4$ to be reflected from the polarizing surface of the beam splitter 38 towards the detector unit 30. The linearly polarized light $L_3$ can be achieved by using the highly polarized light source 26, or by using a polarizer in the optical path of randomly polarized light generated by the light source 26. Preferably, in order to use all the light generated by the light source, such a polarizer includes a polarization splitting means, a polarization rotator in a path of one polarization component, and a polarization combining means. The polarization splitting and combining means may be constituted by the same polarizing beam splitter/combiner, provided an appropriate set of light reflectors is used.

"The expander assembly 28, which in the present example is composed of two lenses 31 and 32, provides for expanding the width of a beam $L_3$ emitted by the laser 26 to thereby fill the back aperture defined by the objective lens arrangement 16. By changing slightly the distance between the two lenses in the assembly 28, it is possible to set the converging point of the laser beam $L_3$ in front of or behind the imaging focus. The focal lengths of the two lenses 31 and 32 determine their effect on the beam's cross-section width, and provide for matching the width of the beam so as to fill the entire back-aperture, and to enable the objective to focus the focus-sensing beam to a diffraction-limited size defined approximately by the equation:

$$Res = \lambda/2NA$$

wherein $\lambda$ is the wavelength of the laser beam impinging onto the beam expander assembly, and $NA = n(\sin\theta)$ is the numerical aperture of the objective, n being the index of refraction of the environment E in front of the objective (e.g., air, or immersion liquids) and $\theta$ being half the solid angle of the light beam after being focused by the objective.

"Thus, the emitted beam of light $L_3$ is expanded by the assembly 28 to be thereby capable of filling the back aperture defined by the objective lens 16. The expanded light beam $L_3$ propagates through the beam splitter 38 and is then reflected by the wavelength-selective surface of the device 22 towards the objective lens 16, which focuses the beam onto a diffraction-limited location on the focal plane of the lens 16.

"The auto-focusing procedure is aimed at locating the sample-supporting surface $S_2$ of the substrate in the focal plane of the objective lens 16. This is implemented by adjusting the focus of the objective to the first interface $S_1$ and thereby yielding a first approximation to the position of the second interface $S_2$ at the other side of the substrate slide where cells grow.

"It should be understood that the imaging focus defined by the objective lens 16 (i.e., the laser auto-focusing point of convergence) and the confocal pinhole 36 in front of the auto-focusing detector are located in conjugated planes. By using the identical optics for imaging and focusing and by filing the entire numerical aperture of the imaging objective, the focus accuracy (z-resolution) is automatically matched to the diffraction-limited values characterizing the optimal imaging of the specimen. On the other hand, the auto-focusing wavelength is split away from the imaging channel, and the detector 33 and pinhole 36 do not block any part of the imaging aperture.

"During the Z-scan (varying the distance between the objective and the substrate along the optical axis of the objective), the incident auto-focusing beam $L_3$ is sequentially reflected by substrate's surfaces $S_1$ and $S_2$, and these sequential reflections $L_4$ propagate through the auto-focusing channel towards the detection unit 30 (i.e., pass through the objective lens 16 and are then reflected from the wavelength-selective surface of the device 22). The surface $S_1$ presents either one of air-glass, air-plastic and immersion liquid-glass interfaces, whatever the case may be, and the surface $S_2$ presents a glass-buffer or plastic-buffer interface. The fraction of light reflected at an interface is proportional to the difference in refractive indices of the two media at opposite sides of the interface, which is about 4% for air-glass interface (i.e., surface $S_1$ which is located closer to the objective), and is about 0.8% for the glass-buffer interface (i.e., surface $S_2$ on which cells are grown). For a 2 mW HeNe laser used as the light source 26 in the auto-focusing device 14, the auto-focusing detector 33 behind the pinhole 36 should theoretically accept 20 μW (calculated as the product of (2 mW)×(4% reflection)×¼) from the air-glass substrate reflection, and 4 μW from the glass-buffer interface reflection. Experiments have shown that, with the 2 mW energy of the emitted light beam $L_3$, 0.7 mW energy is reflected from the substrate's surface $S_2$ and 7 μW energy reaches the detector 33, which is accounted by the objective transmission (80%), slightly overfilling the back aperture, and selective reflector efficiency (80% twice)."

It will be appreciated that when an autofocus device such as shown in FIG. 1 of U.S. Pat. No. 7,109,459 (present FIG. 20) is used as autofocus unit 24 as shown in the present FIG. 1, then the beam splitting device 22 shown in FIG. 1 of U.S. Pat. No. 7,109,459 corresponds to beam splitting device 26 in the present FIG. 1, and the objective lens 16 shown in FIG. 1 of U.S. Pat. No. 7,109,459 corresponds to objective lens 14 in the present FIG. 1

In present FIG. 1, autofocus unit 24 emits a beam of laser light at a wavelength at which the vehicle carrying the sample(s) is transparent, e.g. 635 nm, which is then reflected by a beam-splitting device (dichroic filter 26) onto the optical axis of objective lens 14, reflects off mirrors 18 and 20 through objective lens 14 and onto the vehicle in the sample holder. It is then reflected back along the same pathway, and reflected by dichroic filter 26 back into the autofocus unit, where it is sensed by a sensor (not shown), and a controller (not shown), programmed to adjust the focus of the objective lens along the Z-axis, if necessary. When the autofocus unit 24 is used with samples containing fluorescent labels, the wavelength of the autofocus light may be chosen so as not to elicit a fluorescent response in the sample, although this is generally not critical, as typically the autofocus process will be completed before the image capture process begins.

Also shown in FIG. 1 is an illumination unit 22. Illumination unit 22 includes an illumination source (not shown), such as a mercury lamp, LED lamp or other suitable radiation source. If necessary, the illumination unit 22 includes collimating optics. In the case where the sample contains one or more fluorescent probes or the like, a suitable beam splitting device is arranged so as to reflect the excitation light onto the optical axis of the objective lens 14. This beam splitting device could be a quad filter 28, that reflects light of the excitation wavelength generated by the illumination unit but allows light of other wavelengths, in particular light generated by fluorescence of fluorescent probes in the sample, to pass through. It will be appreciated that illumination unit 22 may be configured to generate electromagnetic radiation of more than one wavelength, or that more than one illumination unit may be employed in order to generate electromagnetic radiation of more than one wavelength, if for example multiple fluorescent probes are employed in the samples being observed, provided that appropriate beam splitting devices are also employed to ensure reflection of the excitation light onto the optical axis of the objective lens 14 and passage of light of wavelengths of interest, e.g. fluorescent light generated by the fluorescent probes in the samples. Also, it will be appreciated that although FIG. 1 shows the autofocus unit 24 being located between the illumination unit 24 and the objective 14, in principle the positions of illumination unit 22 and autofocus unit 24 could be reversed, provided that appropriate optics are provided to ensure that only light of wavelengths of interest passes through to the image capturing devices 30.

As shown in FIG. 1, light which is either reflected off of or generated by the sample (by fluorescence), or, if the sample is illuminated from the side of upper face 13b, light which is transmitted through the sample, travels along the optical axis of objective lens 14 and passes through dichroic filter 26 and quad filter 28 before being detected by one or more image capturing devices 30. FIG. 1 depicts an arrangement in which three such image capturing devices, viz. three CCD cameras 30, 30' and 30" are present, and in which after passing through beam-splitting devices 26 and 28 but before impinging on the CCD cameras, the light passes through a tube lens 32, reflects off a fold mirror 34 and is split by an RGB prism 36 before passes through emission filters 38, 38' and 38" that filter out all light but that of the emission bands of the fluorescent probes in the sample; in the FIG. 1, 38 allows passage of red light, 38' allows passage of green light and 38" allows passage of blue light. It will be appreciated that prism 36 may be other than an RGB prism and filters 38, 38' and 38" may consequently filter in different ranges of wavelengths.

The operation of the system shown in FIG. 1 is controlled by one or more controllers (not shown) which are collectively programmed to control the operation of the autofocus unit, the illumination unit, and the movement of the XYZ scanner. An analysis unit (not shown) for analyzing the images obtained by the image capturing device(s), which may also be part of the one or more controllers or may be a separate unit, may also be provided, and may be configured to provide feedback to the one or more controllers. In addition, as will be appreciated by those skilled in the art, input and/or output devices, such as a keyboard, optical or magnetic storage reader and/or writer, printer, and display device such as a plasma or LCD display, as well as storage devices, may also be provided.

It will be appreciated by those skilled in the art that variations on the arrangement shown in FIG. 1 may be employed in accordance with embodiments of the invention.

Figure 2:
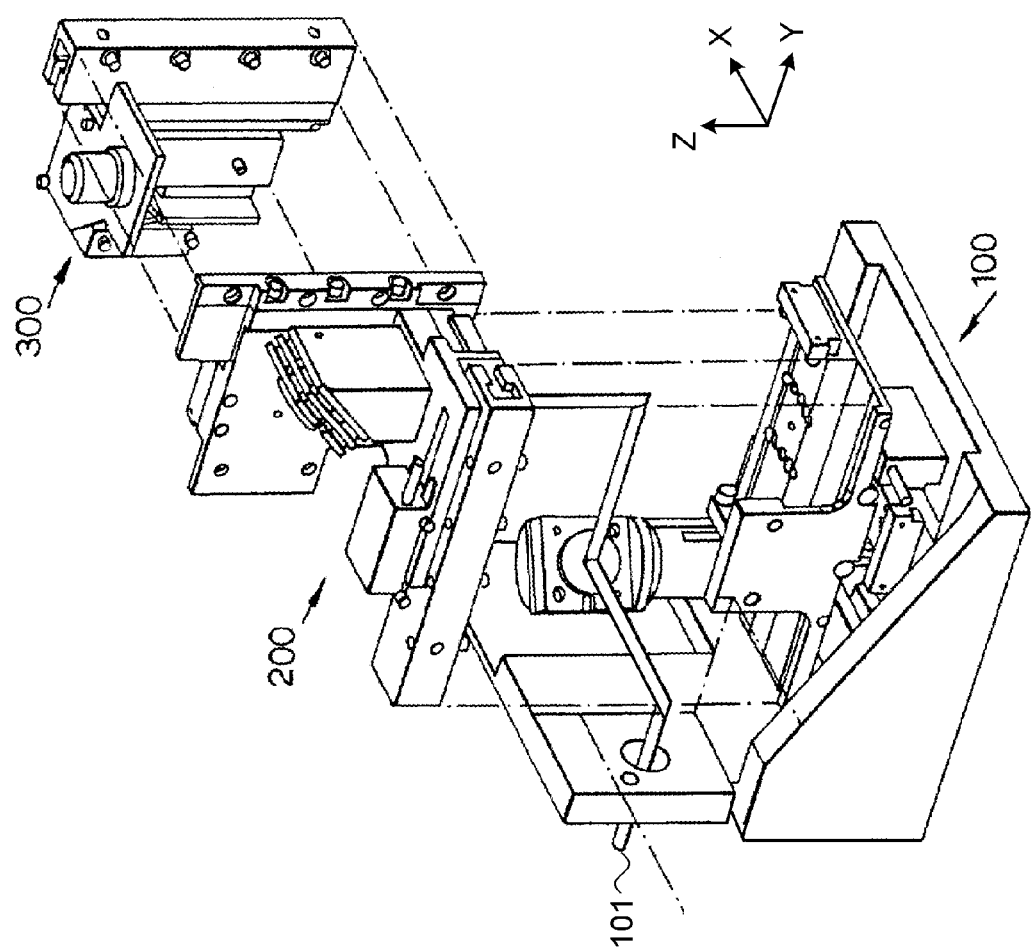
FIG. 2 is an exploded, perspective view of an XYZ scanner suitable for use in accordance with embodiments of the present invention, showing the four units of the XYZ scanner.

Reference is now made to FIGS. 2-7, which are taken from IL 143836 and illustrate an XYZ scanner system suitable for use in accordance with embodiments of the invention, with certain modifications as will be explained below. It will be appreciated that although FIGS. 2-7 describe a particular mechanism that, when employed in embodiments of the present invention, facilitates movement of the objective lens, other mechanisms may be used to this same end in accordance with embodiments of the invention. FIG. 2 shows the three units of an XYZ scanner system suitable for use in accordance with embodiments of the present invention: the X-axis unit 100, the Y-axis unit 200 and the Z-axis unit 300. FIG. 2 does not show a fourth unit, camera unit 400, which in the invention of IL 143836 is optional. IL 143836 camera unit 400 is shown as being physically attached to the XYZ scanner; in embodiments of the present invention, the camera unit, or plurality of camera units, is preferably not physically attached to XYZ scanner system, but is preferably located remotely therefrom, as described infra and supra.

Figure 3:
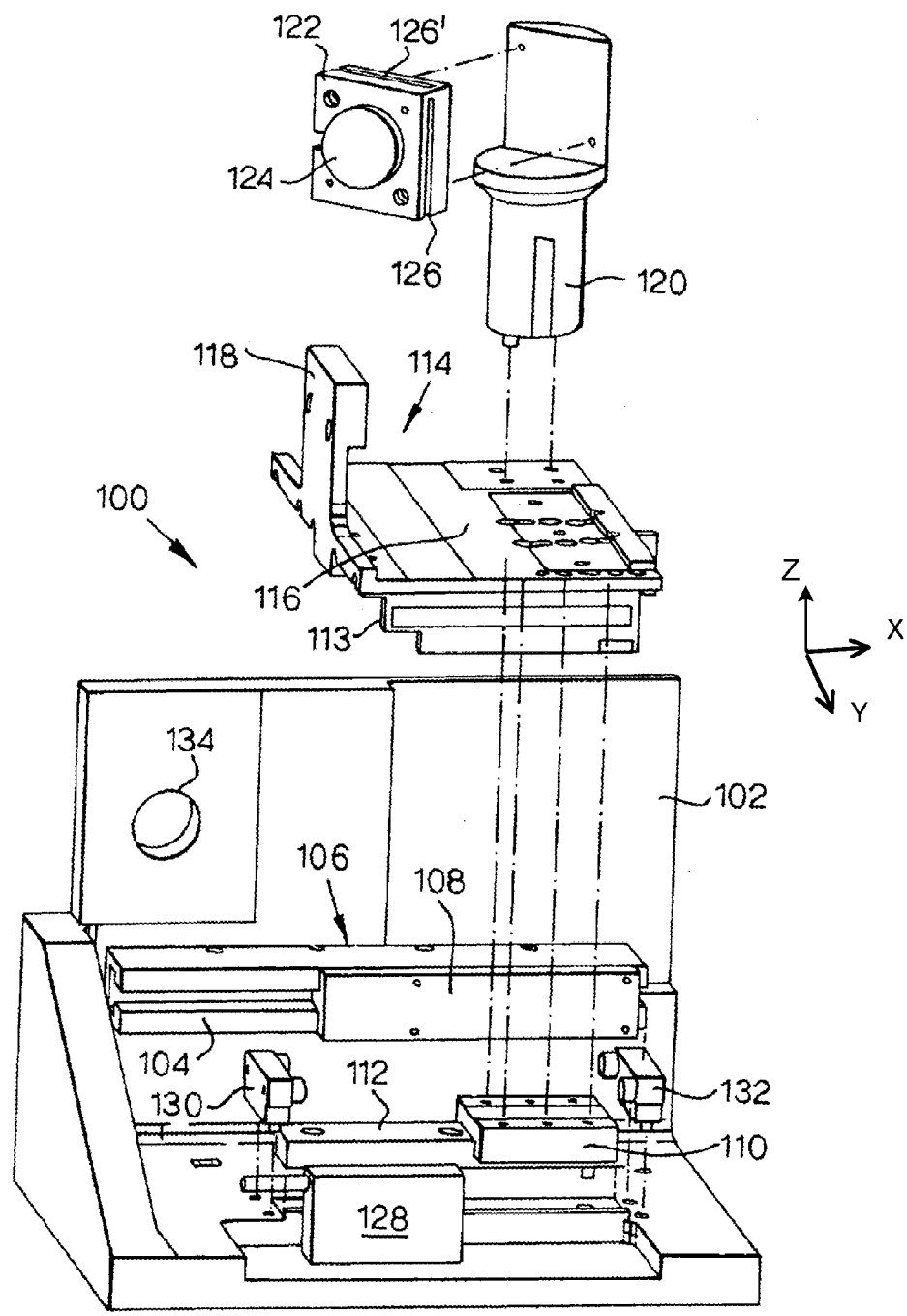
FIG. 3 is an exploded view of the X-axis unit of the XYZ scanner shown in FIG. 2.
Figure 5:
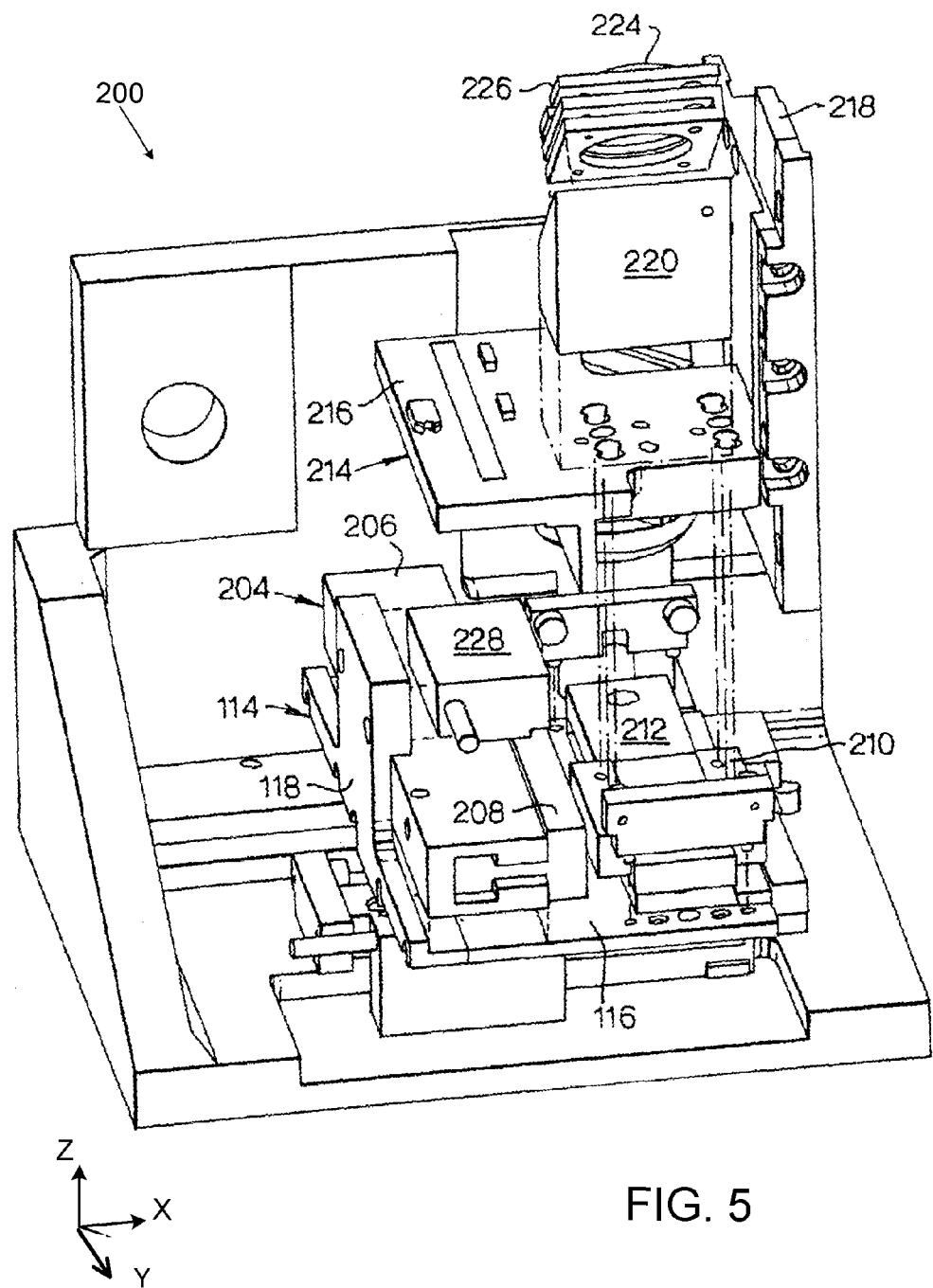
FIG. 5 is an exploded view of the Y-axis unit of the XYZ scanner of FIG. 2, in its position above the XY-bracket of the assembled X-axis unit.
Figure 6:
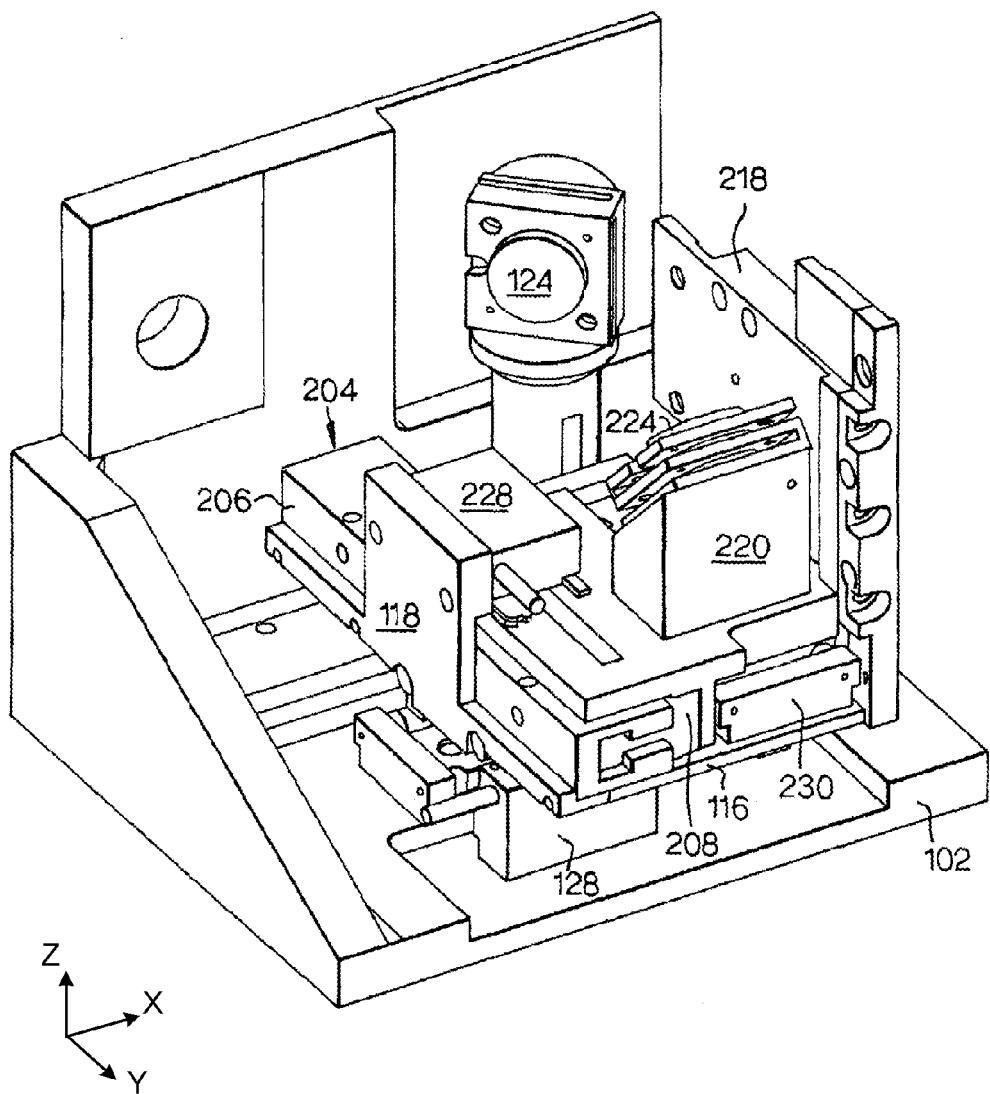
FIG. 6 illustrates the fully assembled X-axis and Y-axis units of FIGS. 3 and 5.

FIG. 3 illustrates X-axis unit 100, showing a chassis member 102, to the bottom of which is fixedly attached stator 104 of a linear motor 106. Such motors are commercially available and can be, e.g., of the electromagnetic, piezo-ceramic, or even the lead-screw type. To runner 108 of motor 106 is connected a vertical, rib-like member 113, projecting downwardly (in the sense of the drawing) from the XY-bracket 114, i.e., the bracket that moves along the X-axis and carries the Y-axis unit 200 (FIG. 5). Bracket 114 has a horizontal member 116 and a vertical member 118. To horizontal member 116 is fixedly attached a slide 110, riding on a guide rail 112 mounted on the bottom surface of chassis member 102. Horizontal member 116 carries a post 120, to which is attached a block 122 mounting X-mirror 124 (which functionally corresponds to mirror 20 in FIG. 1). Block 122 is rendered elastically deformable by the provision of two slots 126, 126', whereby, with the aid of adjusting screws (not shown), mirror 124 can be tilted about two mutually perpendicular axes, in order to facilitate alignment and calibration.

Figure 4:
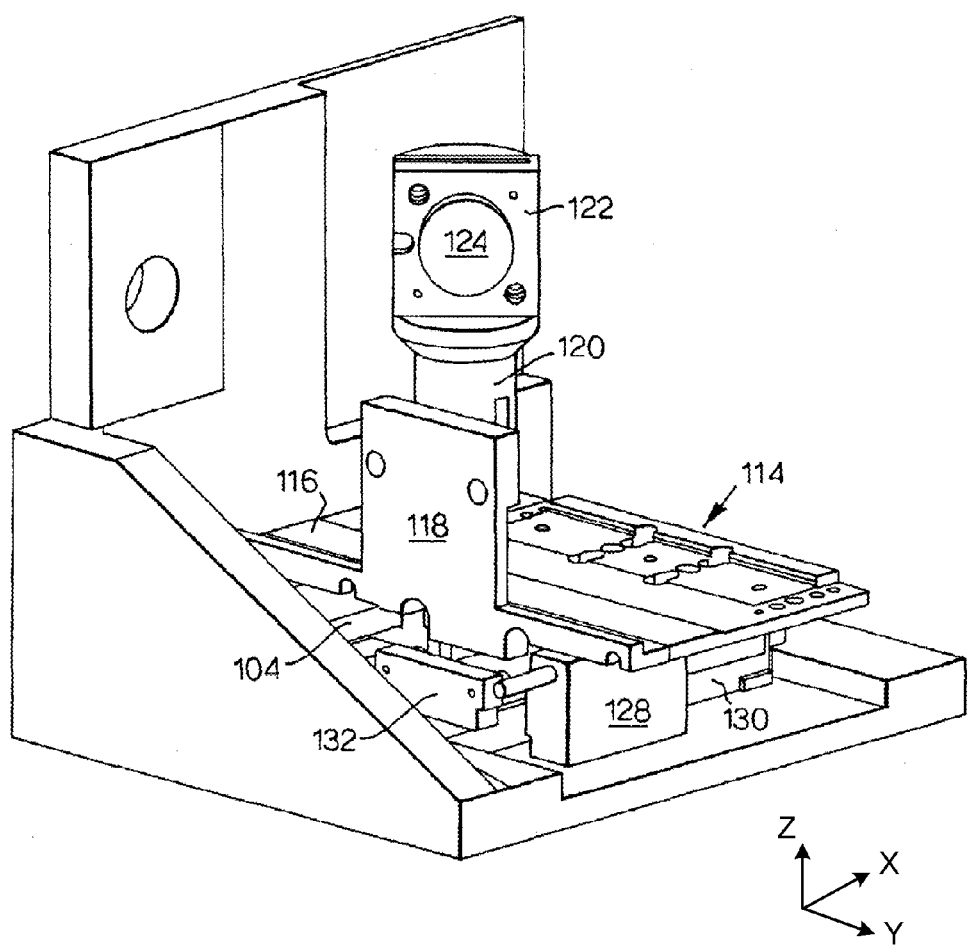
FIG. 4 illustrates the fully assembled X-axis unit of FIG. 3.

Also seen in FIG. 3 is a linear encoder read head 128, fixedly attached to chassis member 102 and cooperating with an encoder scale strip (not shown) attached to rib-like member 113. Further seen are two mechanical stops 130, 132 limiting the X-motion of slide 110 and fixedly attached to chassis member 102. Bore 134 in the rear wall of chassis member 102 serves as the entrance opening for a laser beam 101, as seen in FIG. 2 (which does not show the optical element that reflects this beam toward mirror 124), although it will be appreciated that the overall apparatus design may be such that the laser beam may originate from elsewhere so that the presence of bore 134 in chassis member 102 is unnecessary. FIG. 4 shows the fully assembled X-axis unit.

FIG. 5 is an exploded view of Y-axis unit 200 in its position above XY-bracket 114 of the assembled X-axis unit. It will be appreciated that, both functionally and structurally, Y-axis unit 200 is largely an analogue of X-axis unit 100. Linear motor 204, including its stator 206 and runner 208, is mounted on horizontal member 116 of XY-bracket 114, as is guide rail 212 on which rides slide 210. To the latter is fixedly attached YZ-bracket 214, the horizontal member 216 of which carries post 220, complete with Y-mirror 224 (which functionally corresponds to mirror 18 in FIG. 1) installed in mirror mount 226.

Figure 7:
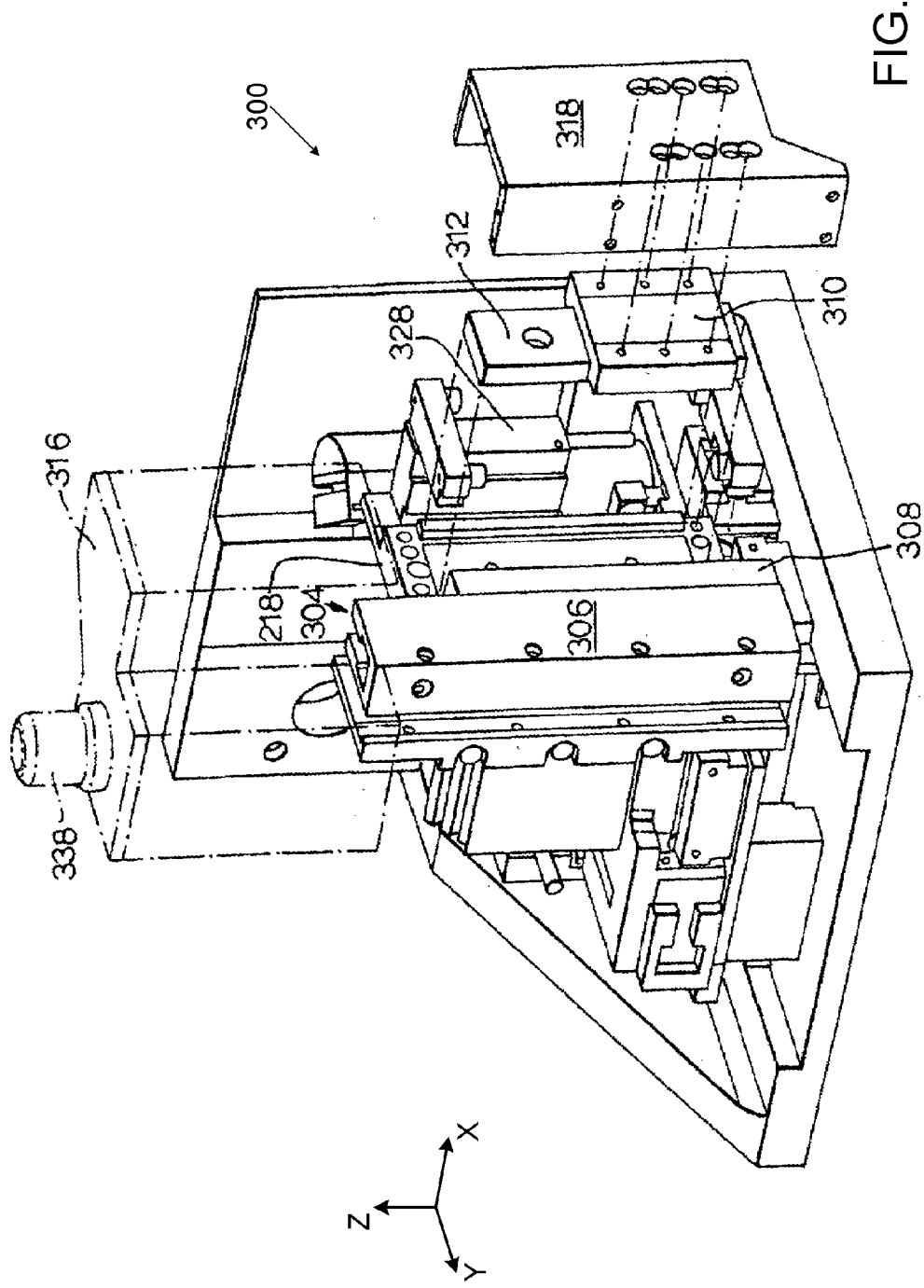
FIG. 7 is an exploded view of the Z-axis unit of the XZY scanner of FIG. 2 in relation to the fully assembled X-axis and Y-axis units.

Vertical member 218 of YZ-bracket 214 serves for the attachment of Z-axis unit 300, as shown in FIG. 7. Also seen is linear encoder read head 228, which, in assembly, is attached to vertical XY-bracket member 118. It will be understood that, due to the nature of the exploded view, encoder 228 appears to be below YZ-bracket 214, while in assembly it is obviously located above bracket 214, as seen in the illustration of the fully assembled X-axis and Y-axis units 100 and 200 of FIG. 6.

FIG. 7 is an exploded view of Z-axis unit 300, shown in its relation to the fully assembled X-axis and Y-axis units 100 and 200. Linear motor 304 is mounted on Y-bracket member 218 (FIGS. 5 and 6), as is guide rail 312. For purely technical reasons, the Z-bracket is designed in two parts: the vertical, channel-shaped member 318, and the plate-shaped horizontal member 316. In assembly, both parts 316 and 318 are joined by screws. Member 318 is connected to motor runner 308 with one of its flanges, and to slide 310 with its web. Also shown is focusing lens 338, the focal length of which is not limited by considerations of distortion-free imaging. The kinematic hierarchy of the system is as follows: linear motor 104 moves all three units; linear motor 204 moves the Y-axis and Z-axis units 200 and 300, and linear motor 304 moves only the Z-axis unit 300, where each of these stages of the motion system are shown in their respective drawings.

Figure 8:
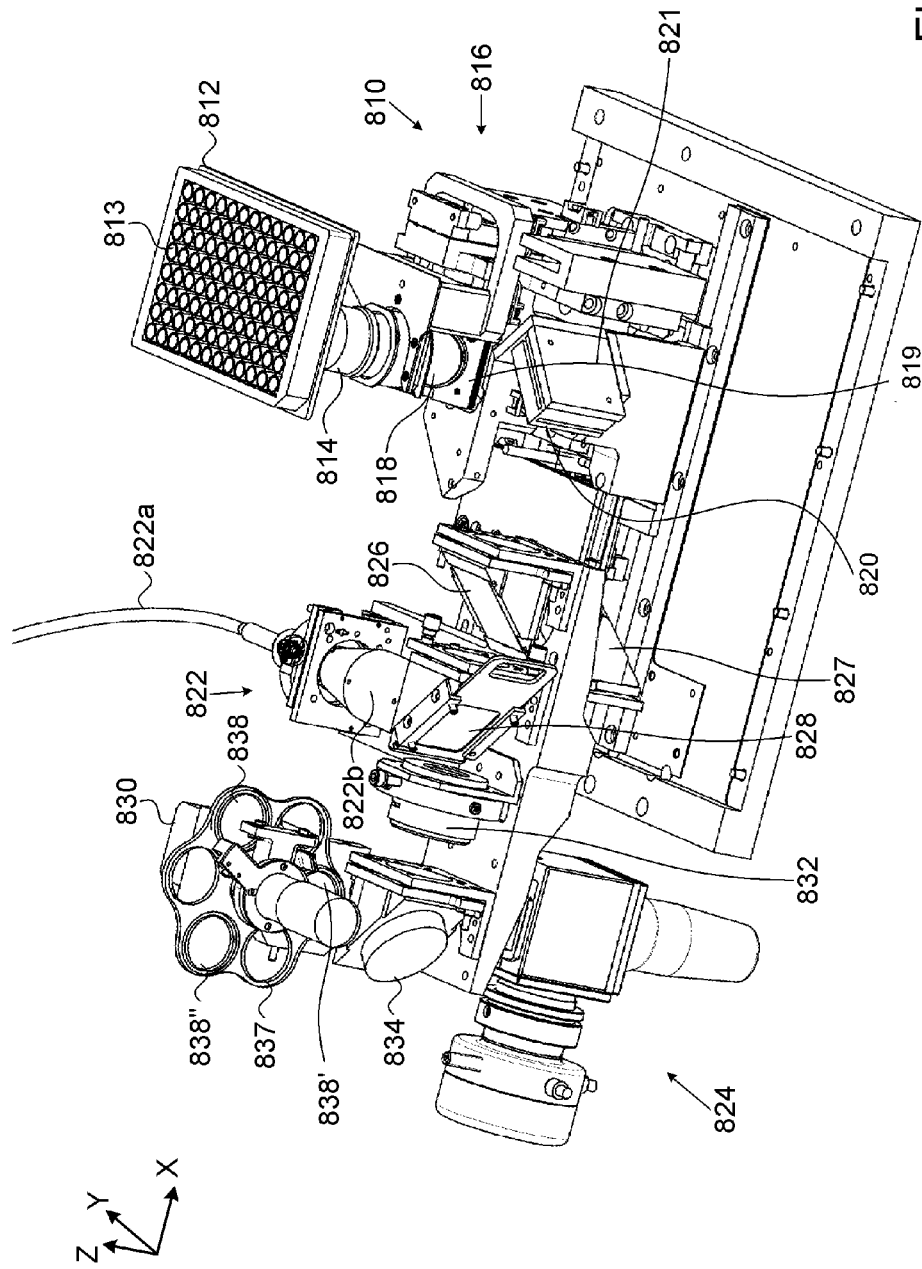
FIG. 8 is an isometric view of an apparatus constructed and operative in accordance with an embodiment of the invention.

An XYZ scanner such as is shown in FIGS. 2-7 can be incorporated into an apparatus in accordance with embodiments of the invention, as is shown in FIG. 8, which shows in isometric view portions of an apparatus 810 constructed and operative in accordance with an embodiment of the invention. Apparatus 810 contains a sample holder 812 which holds a 96-well sample plate 813. Sample plate 813 lies in a plane perpendicular to the optical axis of objective lens 814, which is part of scanner 816 and moveable in three mutually orthogonal directions, viz., the X, Y and Z directions. Scanner 816 includes mirror 818 mounted in mirror mount 819 which is moveable in the X and Y directions, and mirror 820 mounted in mirror mount 821 which is moveable in the X direction. FIG. 8 also shows autofocus unit 824 and a mirror 827 which directs light from the autofocus unit to dichroic filter 826 and vice versa; dichroic filter 826 directs light from autofocus unit 824 to the optical axis of objective lens 814. Also shown is part of an illumination unit 822, including a bundle of fiber optic cables 822a and collimation optics 822b, and quad filter 828, arranged to reflect light from the illumination unit to the optical axis of objective lens 814. Light that reflects off of samples or is generated by the fluorescence in the sample plate (e.g. the fluorescence of fluorescent probes) and that is not filtered out by quad filter 828 is then focused by tube lens 832 and reflected by fold mirror 834 to camera 830; filter wheel 837 contains filters 838, 838' and 838" which can be selected to filter light entering camera 830.

Figure 11:
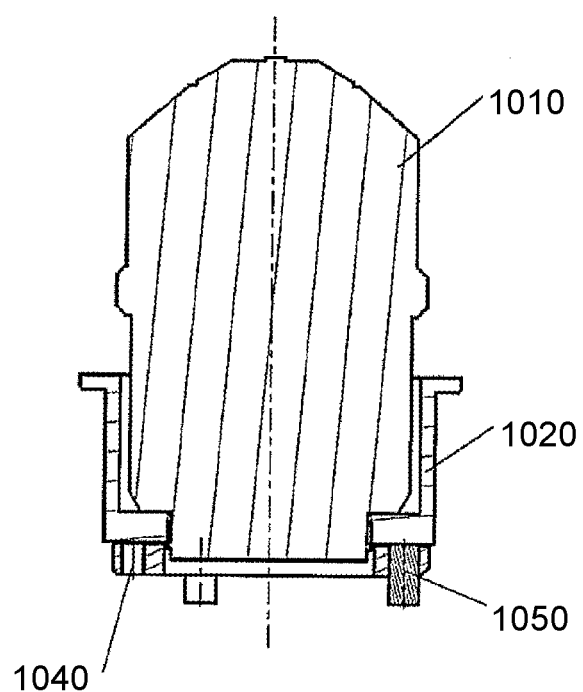
FIG. 11 is a cross-sectional view of an objective lens mounted on an objective lens holder and attached to a kinematic base, in accordance with an embodiment of the invention.
Figure 12:
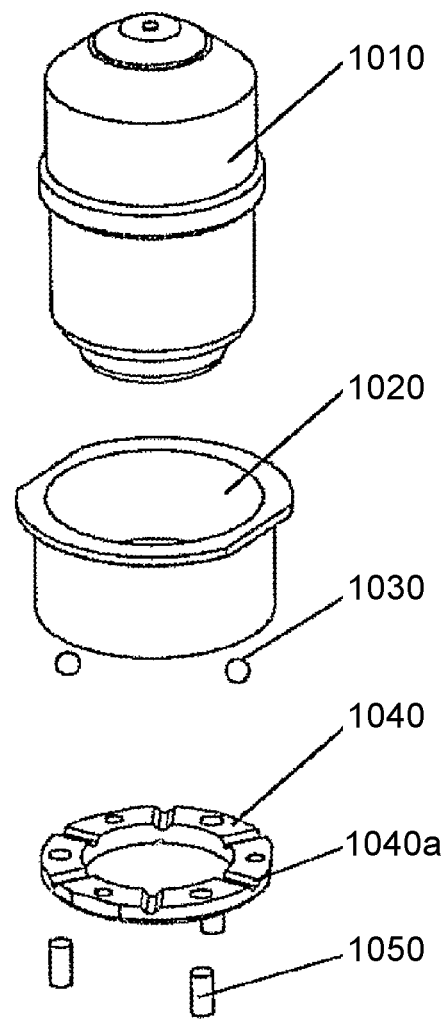
FIG. 12 is an exploded isometric view from above of the components in FIG. 11.
Figure 13:
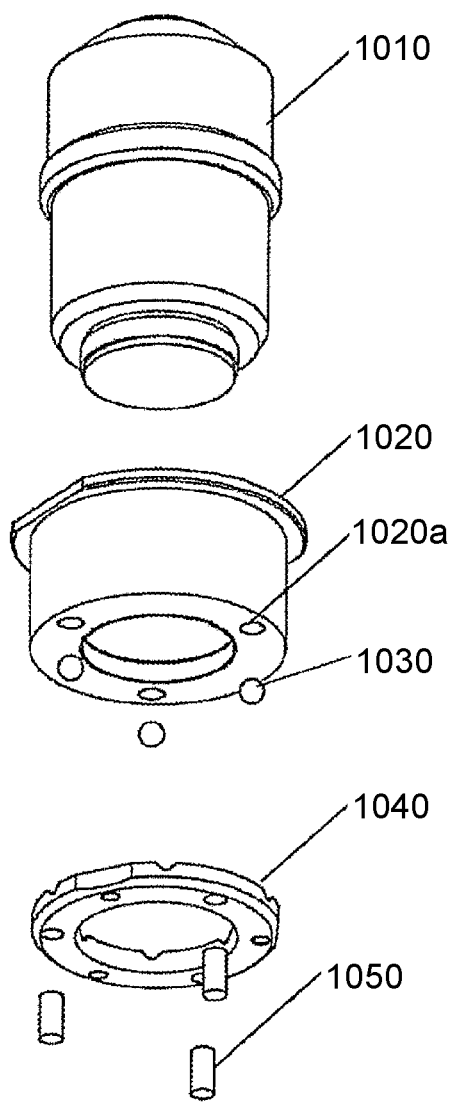
FIG. 13 is an exploded isometric view from below of the components in FIG. 11.
Figure 14:
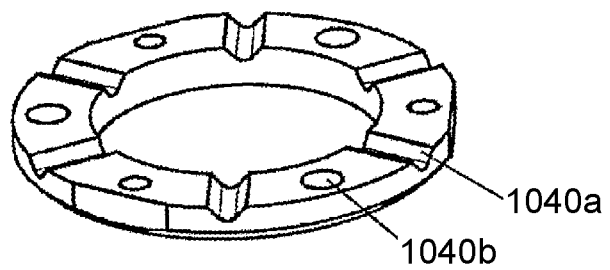
FIG. 14 is an isometric view of the kinematic of FIGS. 12 and 13.
Figure 15:
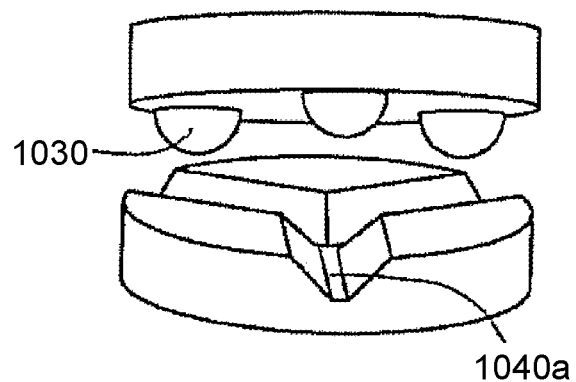
FIG. 15 shows how the lower portion of the objective lens unit of FIGS. 11-13 fits into the V-shaped grooves of the kinematic base of FIG. 14.
Figure 16:
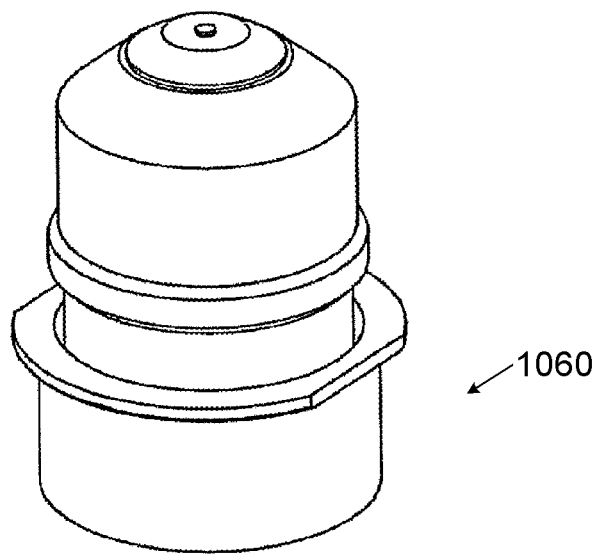
FIGS. 16 and 17 are isometric views from above and below, respectively, showing an objective lens mounted in an objective lens holder and a kinematic base having magnets attached thereto.
Figure 16:
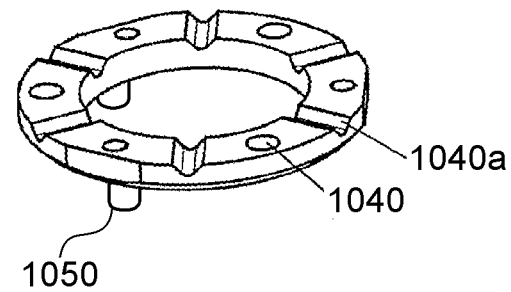
Figure 17:
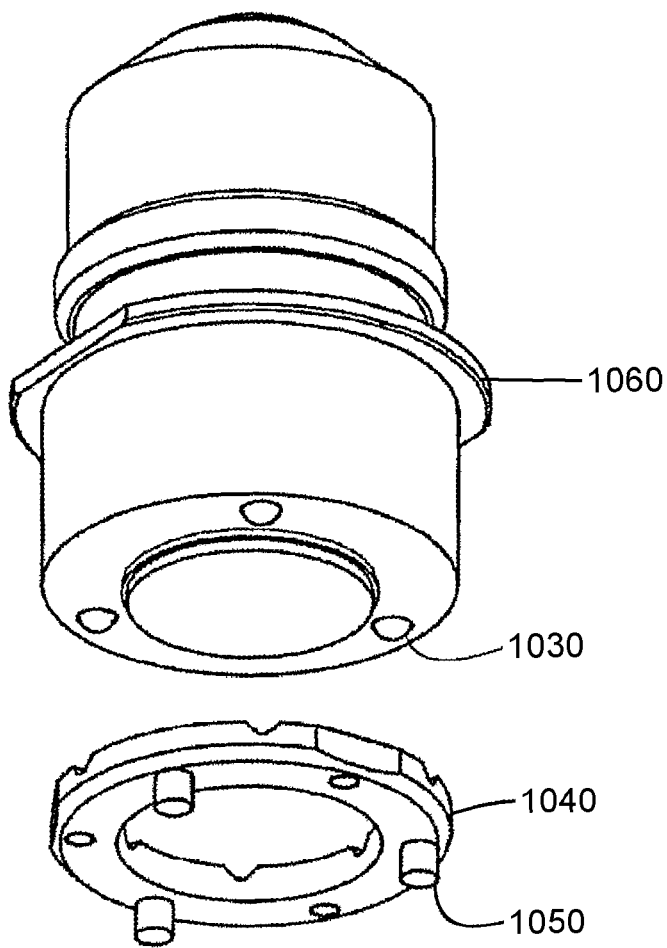

In accordance with some embodiments of the present invention, the apparatus is fitted with a coupling mechanism to facilitate the changing of objective lenses, although it will be appreciated that this mechanism can be employed in other optical instruments. Reference is now made to FIGS. 11-17, which show one embodiment of such a mechanism. As shown in FIGS. 11, 16 and 17, an objective lens 1010 is permanently mounted on objective lens base 1020. Objective lens 1010 and objective lens base 1020 together form objective unit 1060. Objective unit 1060 is attached to a kinematic base 1040. In accordance with some embodiments of the invention, kinematic base 1040 may be mounted permanently on top of the Z-axis component of the XYZ scanner, so that objective unit 1060 containing an objective lens such as lens 338 may be brought to rest thereupon, as will presently be described; alternatively; the kinematic base be formed as part of the top of the Z-axis component of the XYZ scanner. As will presently be described, the attachment between the objective lens base 1020 and the kinematic base 1040, as depicted in the figures, uses a specific kinematic mount configuration, which provides positioning precision in the range of 50 nanometers or better. Objective lens base 1020 contains a plurality of coupling balls 1030 (three such balls are depicted in FIGS. 11-17) and is machined such that after being set in position, there is high accuracy in the spatial position of coupling balls 1030 relative to the optical axis of objective lens. Coupling balls 1030 are of high stiffness (e.g. hardness of 53-58 RC SS or more) and of suitable diameter, e.g. 3-3.5 mm. Each of coupling balls 1030 is held in place in one of holes 1020a formed in the lower surface of objective lens base 1020 such that 30-40% of the ball diameter protrudes downwardly out of the lower surface of objective base 1020. Holes 1020a may penetrate only partially into objective lens base 1020, whereby to form a cylinder having one end closed, or they may run completely through the bottom of objective lens base 1020. Each of holes 1020a has an interference diameter tolerance with the coupling ball 1030 placed therein, whereby to hold the ball firmly in place. Objective lens base 1020 is made of ferromagnetic steel such as 17-4PH.

As depicted in the figures, kinematic base 1040 is of generally annular ring shape, and has several indentations in the form of V-shaped grooves 1040a formed in the upper side thereof. The spacing of coupling balls 1030 and grooves 1040a is such that the coupling balls fit into three of the grooves, as shown in simplified form in FIG. 15. Kinematic base 1040 may also be built of high performance ferromagnetic steel such as 17-4PH, which is thermally treated to reach a surface hardness of 39RC or higher, so that kinematic base 1040 will maintain attachment precision over cycling load and unload operations of the lens unit 1060. To ensure that kinematic base 1040 has the required surface hardness, the following manufacturing process is observed: (a) manufacture parts to final dimensions leaving 50 micron for the final groove 1040*a* grinding process; (b) perform thermal hardening process; (c) grind the V groove 1040*a* to the final dimensions.

As shown in the figures, kinematic base 1040 is formed with three holes 1040*b* therethrough, spaced approximately evenly around the base. A magnet 1050 is inserted into each hole 1040*b* and glued in place. Together magnets 1050 cause a magnetic attachment force with the objective unit 1060 when the parts are in close proximity. This attachment force both positions the objective in place, by balancing the attachment forces applied on the kinematic coupling, as well as maintains the objective unit 1060 in place while the optical system moves at high acceleration. It will be appreciated that the magnets needs not necessarily come into contact with the object base 1060 nor, as can be see e.g. in FIG. 17, even protrude through holes 1040*b*. Thus, in this application, when it is stated that such magnets are "installed within" a surface that is opposite a ferromagnetic surface, the magnets may protrude out from, or be embedded within or even below the surface that they are "installed within", since magnetic attractive force operates without the need for direct physical contact.

Although a particular embodiment of the coupling mechanism has been shown in FIGS. 11-17, it will be appreciated that variations on what is shown therein are possible. This is because the collective effect of the balls 1030 and grooves 1040*a* is to both precisely locate the objective unit 1060 in the XY plane and to restrict the motion of the objective unit 1060 in the XY-plane and the negative Z-direction, and the addition of the magnetic force restricts motion of the objective unit in the positive Z direction, and these effects can in principle be achieved with other arrangements. Thus, for example, more or fewer holes 1040*b* and, accordingly, more or fewer magnets could be employed, and the magnets could installed within the bottom of the lens objective unit as well as the kinematic base, or the magnets could be installed exclusively within the bottom of the lens objective unit. Similarly, the positions of the indentations and balls could be reversed, so that the bottom of the objective unit 1060 contains indentations, such as grooves, and the upper surface of the kinematic base has balls protruding therefrom, or both the objective unit and the kinematic base could have indentations and balls, or the kinematic base could have two grooves and a protrusion and the bottom of objective unit 1060 could have two corresponding protrusions and a corresponding groove. Moreover, the indentations may be in a shape other than V-shaped grooves, for example one or more of the indentations could be in the shape of a well that provides three points of contact for a ball 1030 resting therein rather than two points of contact as in a V-shaped groove. One such a well, in combination with a single V-shaped groove and the surface of the kinematic base and appropriately positioned magnets of sufficient strength, could have the same effect as three V-shaped grooves. Furthermore, protrusions other than a ball shape that fit into those indentations may be employed. Thus, for example, persons skilled in the art will appreciate that although in the figures a plurality of balls 1030 are shown held in holes, other construction arrangements are possible, for example round-headed nails may be used. The relative positions of the indentations may also differ from what is shown in FIGS. 11-17: the indentations may be arranged so that there is only one way for the protrusions from the opposite piece to fit therein, thus providing only a single way for the objective unit to set in place on the kinematic base. Alternatively, three protrusions may be used (to ensure that the piece with the protrusions sits on a plane), for example as described above with respect to the objective lens unit, but instead of three or six V-shaped grooves being presented in the opposite piece (e.g. as shown above with respect to the kinematic base), a larger number of evenly-spaced, radially-oriented V-shaped grooves may be employed, such as 9 or 12, to facilitate easier placement of the lens unit, for example when used in an objective lens changer like the lens changer described below. In addition, although FIGS. 11-17 show an objective unit 1060 which is formed from an objective lens 1010 and objective lens base 1020, it will be appreciated that objective lens 1010 may be formed in a way that obviates the need for objective lens base 1020, for example if the bottom of objective lens 1010 is made from a ferromagnetic material and machined so as to have coupling balls 1030 protruding therefrom. It will be appreciated that where it is stated in the description or claims that the objective lens has a surface "associated therewith", such surface may be a surface of the objective lens assembly itself, or it may be a surface of a lens holder or base on which the objective lens is mounted, such as is shown in FIGS. 11-17.

The coupling mechanism described above enables an objective lens to repeatedly be inserted and removed into the optical device, with sufficient accuracy to enable high precision observations to be obtained using the objective lens. Consequently, the mechanism described herein facilitates the use of a multiplicity of objective lenses in the optical device, since lenses can be swapped in and out; in the case of the device shown in the figures, this can be accomplished without burdening the XYZ scanner with the weight of the full complement of objective lenses, thus facilitating higher accelerations than could be employed, and quicker settling times than could be achieved, if the XYZ scanner were to bear the weight of the entire set of objective lenses. Instead, the objective lenses may be stored elsewhere in the apparatus and exchanged as necessary when it is desired to change magnification. Thus, as shown in FIGS. 18 and 19, magazine 1080 holds a plurality of objective units 1060 in a plurality of stations 1070. Each objective unit 1060 in magazine 1080 is roughly aligned with the Z-axis of XYZ scanner 1090 and roughly perpendicular to the plane of kinematic base 1040, which is attached to the upper portion of XYZ scanner 1090, and furthermore the ball couplings 1030 protruding from the bottom of each objective unit 1060 are positioned so that they will engage the V-shaped grooves 1040*a* in the kinematic base when the XYZ scanner is raised to contact the objective unit, as described below. Each station 1070 includes a pair of arms 1072, so that each pair of adjacent arms can hold an objective unit 1060. Although as shown in FIGS. 18 and 19, magazine 1080 holds three objective units 1060, in principle an optical device may be designed to hold more such objective units.

To illustrate how the coupling mechanism may be employed to change objective lenses, assume that scanner 1090 initially has no objective unit attached thereto, as depicted in FIG. 18, and that at least one objective unit 1060 is loaded on one station 1070. Scanner 1090 is first moved to a Z-position which is sufficiently low to enable it to move under a selected objective unit 1060. The XYZ stage is then moved in the XY plane to a position in which the optical axis of the selected objective lens resting in station 1070 is roughly aligned with the optical axis that will be required of the objective lens once positioned for use on XYZ scanner 1090.

The Z stage is then moved upwardly so as to come into contact with the lower portion of selected objective unit 1060. This results in the coupling balls 1030 resting in grooves 1040*a*. The proximity of the magnets 1050 to the bottom of objective unit 1060, which is made of ferromagnetic material and thus attracted to the magnets, results in coupling balls 1030 settling in the grooves and being held there. As depicted in FIGS. 11-19, when the coupling balls and the V-shaped grooves are machined with sufficient precision (e.g. within 50 nm tolerance), the use of three coupling balls at approximately 120° separation and V-shaped grooves oriented radially from the center of the kinematic base and into which the coupling balls fit results in the optical axis of the objective lens being set with sufficient accuracy to enable use of the objective lens without further calibration. The Z stage is moved further upward, sufficiently to lift the objective unit 1060 off arms 1072. The XY stage may then be moved out of the station 1070. The optical system is now ready to operate using the selected objective.

A similar process is repeated when changing from the first objective to a second one. The scanner is moved to an open station 1070 and, operating in the reverse sequence from that described above, places the first objective unit 1060 in the station 1070. The XYZ stage then moves to a different station and loads the second objective in a manner analogous to that described above for the first objective.

It will be understood that the movements of the XYZ scanner may be automated, effected by appropriate motors and controlled by a microprocessor that has been programmed for such purpose.

It will also be appreciated that although in FIGS. 18 and 19, an XYZ optical scanner 1090 is shown as the device for facilitating transfer of an objective on and off the optical system, the method described is not restricted to use with an XYZ optical scanner and can be used in any system having moving optical elements controlled by a combination of motors, encoders, sensors, servo controller or other automation elements. Furthermore, in cases in which the moving optical system cannot reach all objective units, a secondary motion system (not shown) may be employed to move the magazine 1080 so that the particular lens in question is in a position that is accessible to the optical system.

Figures 9A, 10:
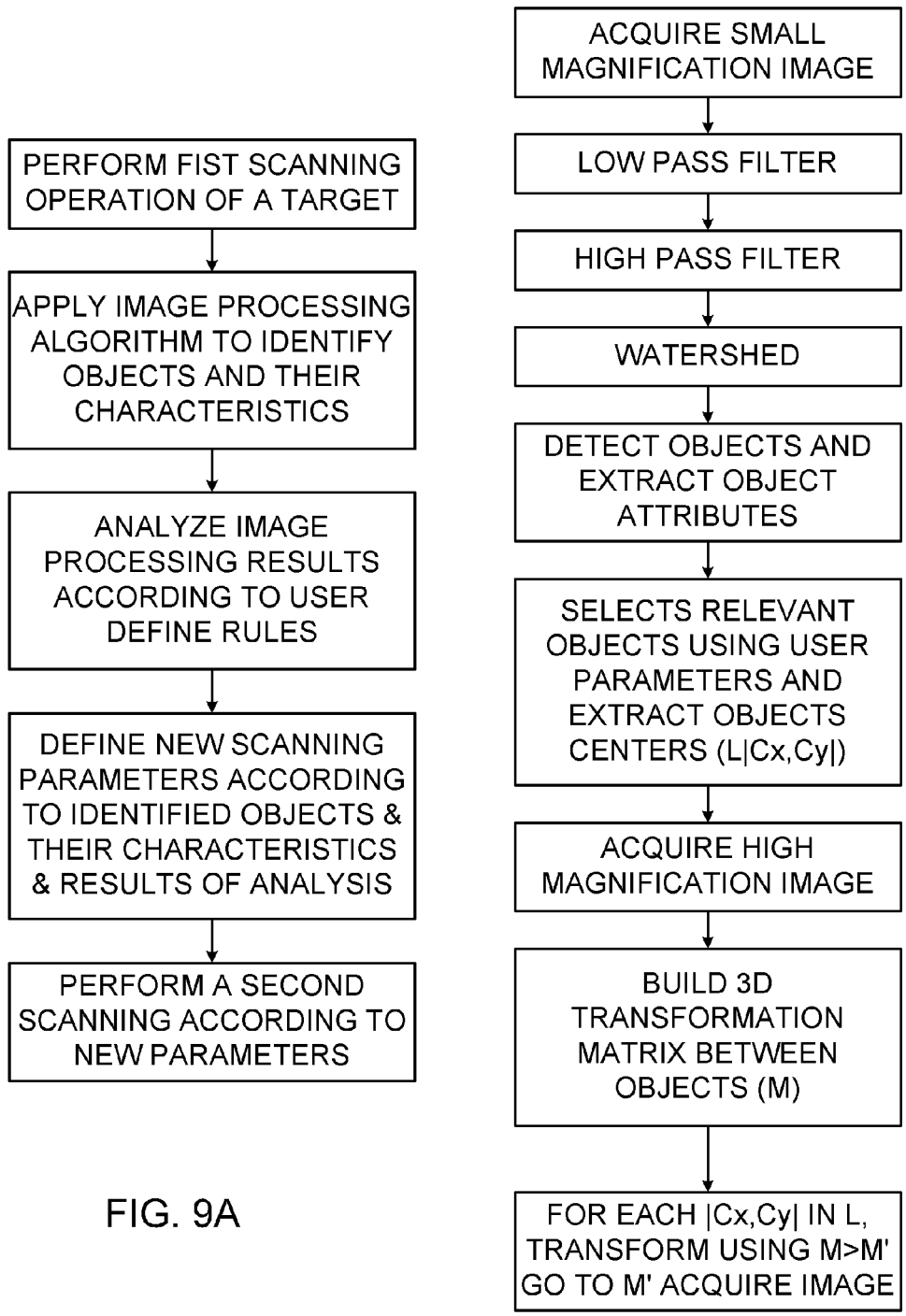
FIGS. 9A, 9B and 10 are flowcharts outlining a method for scanning a sample, in accordance with embodiments of the invention.
Figure 9B:
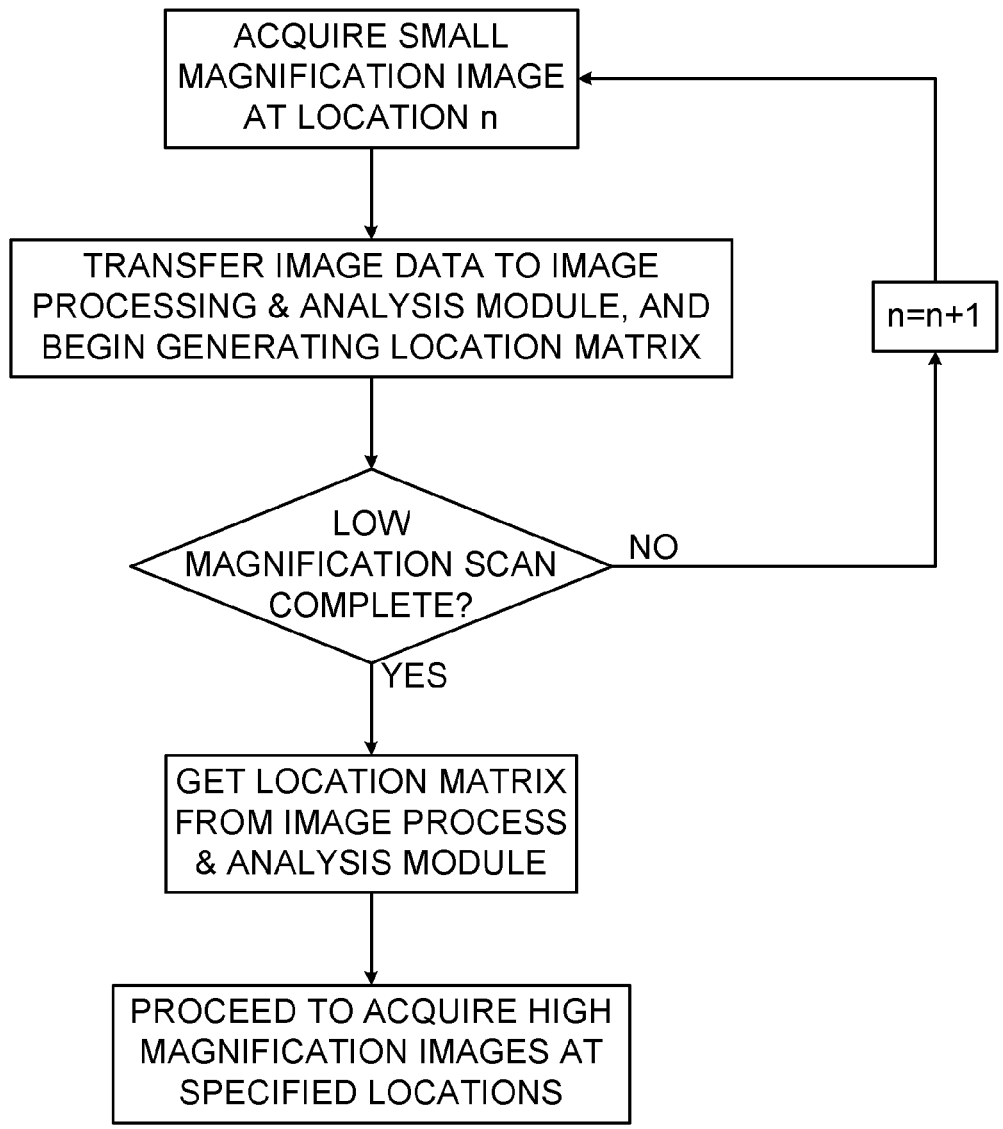

Reference is now made to FIGS. 9A, 9B and 10, which show flowcharts outlining methods of scanning, as well as image processing and analysis, in accordance with embodiments of the invention. The flowchart in FIG. 9A outlines the scanning process according to some embodiments of the present invention. Initially, a first scanning operation of a target is performed according to user-defined parameters, such as size (e.g. ignore objects larger than and/or smaller than a particular size), shape (ignore non-circular objects or non-semi-circular objects), intensity, etc. The scanned image so obtained is then processed to identify objects of interest and their characteristics; this processing may be effected using image processing algorithms that are presently known in the art or that may be developed in the future. The image processing results are then analyzed according to predefined rules for determining the optimal parameters for performing further scanning operations of the same area. Based on the results of this analysis, new parameters are defined for scanning to acquire a new image of the same target. At least one second scanning operation is then performed using the new scanning parameters. Thus, for example, the system may scan a biological sample plate having 96 wells of 6 mm diameter each. During the scan, the image processing algorithm recognizes each living cell present in the plate; if two or more cells are attached together, or if there are individual cells larger than a certain size, the system may note this as an unusual event which should be observed further using higher magnification optics; if an objective lens changer such as the one described above is present, the lens can be changed to facilitate such observation. The system them determines the parameters that define the proper image quality for the high magnification scan. In some embodiments, the image processing is performed while the first scanning operation is still running, in which case the results of the analysis may affect the operations of the scanning in real time, in accordance with the newly-defined parameters. In some embodiments the at least one second scanning operation is performed at higher magnification than the first scanning operation; in some embodiments, in which the present method is utilized in conjunction with an apparatus equipped with an objective lens changer as described above, the second scanning operation at higher magnification is performed by changing to a higher magnification objective lens using the objective lens changer and then scanning the areas of interest at higher magnification.

FIG. 9B is a flowchart of the scanning process in accordance with some embodiments of the present invention. At the first stage of the scanning, a low magnification image at a defined location is acquired; this process is repeated until images at a plurality of defined locations are acquired. Upon acquisition, each scanned image is transferred to an image processing and analysis module, which begins image processing and analysis upon receipt of the first image; this module may be incorporated into the software controlling the overall operation of the optical device or may be located at a different software application or computer. The processing and analysis module uses the results of the processing and analysis to begin generating a location matrix which includes information about areas of interest in accordance with objects identified by the initial scan and their characteristics. The location matrix may thus be completed shortly after completion of the low magnification scan. Alternatively, the location matrix may be generated after all processing and analysis is complete. On the basis this location matrix, the second stage of scanning is performed, during which high magnification images at specified locations of interest are acquired.

FIG. 10 is a flowchart of the image processing and analysis process according to some embodiments of the present invention. At the first stage of the image processing the following steps are performed: acquire a small magnification image, apply a low pass filter to the data obtained, apply a high pass filter to the data obtained, and perform a Watershed transformation. On the basis of these image processing steps, objects and object attributes/characteristics are detected and extracted. Next, relevant objects are selected using user parameters/attributes/characteristics, and object centers (L[Cx,Cy]) are extracted. High-magnification images of the selected objects are then obtained, from which a 3D transformation matrix between objects (M) is then created, and then utilized.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the general combination of parts that perform the same functions as exemplified in the embodiments, and includes both combinations and sub-combinations of the various features described hereinabove as well as variations and modifications thereof, which would occur to persons skilled in the art upon reading the foregoing description.

What is claimed is:

1. An apparatus for magnifying and capturing images of one or more samples, the apparatus comprising:
a stationary sample holder;
a linear optical scanner having a single optical input axis and which linear optical scanner moves relative to said stationary sample holder, the linear optical scanner having
(a) an objective lens which is movable along three generally mutually orthogonal axes, the objective lens having a first surface proximal to the sample holder and a second surface associated therewith distal to the sample holder,
(b) a first mirror which reflects incident electromagnetic radiation to and from the objective lens and which can be moved in concert with said objective lens along the first and second of said axes and
(c) a second mirror which reflects incident electromagnetic radiation to and from the first mirror and which can be moved in concert with said first mirror along the first axis;
an autofocus unit which directs incident electromagnetic radiation of a first wavelength toward the sample holder along said optical input axis and collects reflections at said first wavelength received along said optical input axis;
an illumination unit which directs electromagnetic radiation of a second wavelength toward the sample holder along the optical input axis of said scanner;
an electromagnetic radiation capturing unit for acquiring images from said sample holder which are transmitted along the optical input axis, said electromagnetic radiation capturing unit including at least one sensor; and
a tube lens positioned along said optical input axis, the tube lens focusing electromagnetic radiation of a third wavelength on said electromagnetic radiation capturing unit;
wherein the objective lens is removably attached to the optical scanner via a mechanism for removably holding an objective lens in an optical instrument in a predetermined position, which mechanism comprises:
a kinematic base, the kinematic base defining an aperture therethrough, the kinematic base having defined on a surface thereof facing the second surface associated with the objective lens at least one of (a) a plurality of indentations and (b) a plurality of protrusions;
and the second surface associated with the objective lens has at least one of (a) a plurality of protrusions which are alignable with the indentations on the facing surface of the kinematic base and (b) a plurality of indentations which are alignable with the protrusions on the facing surface of the kinematic base;
wherein at least one of the facing surface of the kinematic base and the second surface associated with the objective lens is made of a ferromagnetic material,
the mechanism further comprising at least one of (a) a plurality of magnets which are installed within the second surface associated with the objective lens, when the facing surface of the kinematic base is made of a ferromagnetic material, and (b) a plurality of magnets which are installed within the facing surface of the kinematic base, when the second surface associated with the objective lens is made of a ferromagnetic material,
such that, when the plurality of protrusions are aligned with the plurality of indentations and brought into proximity therewith, the optical axis of objective lens is aligned with the aperture in the kinematic base and the plurality of magnets are sufficiently close to the ferromagnetic material to hold the objective lens in said predetermined position relative to said kinematic base.

2. The apparatus of claim 1, wherein the kinematic base contains protrusions and the second surface associated with the objective lens contains indentations.

3. The apparatus of claim 1, wherein the kinematic base contains indentations and the second surface associated with the objective lens contains protrusions.

4. The apparatus of claim 3, wherein the indentations in the kinematic base are in the form of V-shaped grooves.

5. The apparatus of claim 4, wherein the axes of the V-shaped grooves are aligned generally perpendicularly to the aperture defined in the kinematic base.

6. The apparatus of claim 5, wherein the V-shaped grooves substantially traverse the width of the kinematic base.

7. The apparatus according to claim 3, wherein the second surface associated with the objective lens has a plurality of cylindrical wells defined therein, and the protrusions projecting from second surface associated with the objective lens are spherical balls which are held in place by the walls of the cylindrical wells and protrude therefrom.

8. A mechanism comprising:
a kinematic base, the kinematic base defining an aperture therethrough, the kinematic base having defined on a first surface thereof facing the objective lens at least one of (a) a plurality of indentations and (b) a plurality of protrusions; and
an objective lens having a lower surface associated therewith facing said first surface of said kinematic base, said lower surface having at least one of (a) a plurality of protrusions which are alignable with the indentations on the first surface of the kinematic base and (b) a plurality of indentations which are alignable with the protrusions on the first surface of the kinematic base;
wherein at least one of the first surface of the kinematic base and the lower surface associated with the objective lens is made of a ferromagnetic material,
the mechanism further comprising at least one of (a) a plurality of magnets which are installed within the lower surface associated with the objective lens, when the first surface of the kinematic base is made of a ferromagnetic material, and (b) a plurality of magnets which are installed within the first surface of the kinematic base, when the lower surface associated with the objective lens is made of a ferromagnetic material,
such that, when said plurality of protrusions are aligned with said plurality of indentations and brought into proximity therewith, the optical axis of objective lens is aligned with the aperture in the kinematic base and the plurality of magnets are sufficiently close to the ferromagnetic material to hold the objective lens in a predetermined position relative to said kinematic base.

9. The mechanism of claim 8, wherein the first surface of the kinematic base contains indentations and the lower surface associated with the objective lens contains protrusions.

10. The mechanism of claim 9, wherein the indentations in the kinematic base are in the form of V-shaped grooves.

11. The mechanism of claim 10, wherein axes of the V-shaped grooves are aligned generally perpendicularly to the aperture defined in the kinematic base.

12. The mechanism of claim 11, wherein the V-shaped grooves substantially traverse the width of the kinematic base.

13. The mechanism of claim 9, wherein the lower surface associated with the objective lens has a plurality of cylindrical wells defined therein, and the protrusions projecting from the lower surface associated with the objective lens are spherical balls which are held in place by the walls of the cylindrical wells and protrude therefrom.

14. The mechanism of claim 8, wherein the kinematic base contains protrusions and the lower surface associated with the objective lens contains indentations.

15. The mechanism of claim 14, wherein the indentations in the lower surface associated with the objective lens are in the form of V-shaped grooves.

16. The mechanism of claim 15, wherein the axes of the V-shaped grooves in the lower surface associated with the objective lens are aligned generally perpendicularly to the optical axis of the objective lens.

17. The mechanism of claim 16, wherein the V-shaped grooves in the lower surface associated with the objective lens substantially traverse the width of the lower surface associated with said objective lens.

18. The mechanism of claim 14, wherein the first surface of the kinematic base has a plurality of cylindrical wells defined therein, and the protrusions projecting from said first surface are spherical balls which are held in place by the walls of the cylindrical wells and protrude therefrom.

19. The mechanism of claim 8, wherein the upper surface of the kinematic base is made of a ferromagnetic material, and a plurality of magnets protrude downwardly from the lower surface associated with the objective lens.

20. The mechanism of claim 8, wherein the objective lens is mounted on a lens base having upper and lower surfaces and defining an aperture therethrough, the upper surface of the lens base being adapted to hold the objective lens so that the optical axis of the lens is aligned with said aperture defined through said lens base, the lower surface of the lens base being said lower surface associated with the objective lens.

* * * * *